MULTIPLEX COMMUNICATION SYSTEM

Filed June 23, 1950 9 Sheets-Sheet 1

MAIN PROGRAM CIRCUIT

SUBSCRIPTION RADIO PROGRAM CIRCUIT

BUSINESS MESSAGE OR SECOND SUBSCRIPTION RADIO CIRCUIT

INVENTOR
WILLIAM S. HALSTEAD
BY
ATTORNEY

INVENTOR
WILLIAM S. HALSTEAD
BY
ATTORNEY

Dec. 7, 1954 W. S. HALSTEAD 2,696,611

MULTIPLEX COMMUNICATION SYSTEM

Filed June 23, 1950 9 Sheets-Sheet 3

INVENTOR.
WILLIAM S. HALSTEAD

BY

Herbert Smith
ATTORNEY

MULTIPLEX COMMUNICATION SYSTEM

INVENTOR
WILLIAM S. HALSTEAD
BY
Herbert [signature]
ATTORNEY

INVENTOR
WILLIAM S. HALSTEAD
BY
Herbert Smith
ATTORNEY

Dec. 7, 1954 W. S. HALSTEAD 2,696,611

MULTIPLEX COMMUNICATION SYSTEM

Filed June 23, 1950 9 Sheets-Sheet 6

INVENTOR
WILLIAM S. HALSTEAD
BY
Herbert Smith
ATTORNEY

INVENTOR
WILLIAM S. HALSTEAD
BY
ATTORNEY

INVENTOR.
WILLIAM S. HALSTEAD
BY
Herbert H. Smith
ATTORNEY

H.P. FILTER RESPONSE

DISCRIMINATOR RESPONSE

COMPOSITE OF H.P. FILTER & DISCRIMINATOR RESPONSE

INVENTOR.
WILLIAM S. HALSTEAD
BY
Herbert [signature]
ATTORNEY

United States Patent Office 2,696,611
Patented Dec. 7, 1954

2,696,611

MULTIPLEX COMMUNICATION SYSTEM

William S. Halstead, Mount Kisco, N. Y., assignor to Multiplex Development Corporation, New York, N. Y.

Application June 23, 1950, Serial No. 170,011
8 Claims. (Cl. 343—176)

This invention relates to multiplex systems, and more particularly to a form of multiplexing applicable to frequency modulation (FM) broadcast stations or the sound channel of television stations wherein one or more multiplex channels are applied to one or a multiplicity of FM broadcast transmitters without causing mutual interference between the multiplex channel or channels and the primary or main program transmissions, which may normally extend in the range between 30 and 15,000 cycles, and without requiring the use of special filters in conventional broadcast receivers currently in the hands of the public.

More particularly the invention contemplates the use of conventional FM broadcast stations in disseminating throughout large geographical areas multiplexed subcarrier signals conveying special programs of musical or other type, protected by security means, viz., signals intended for reception only by authorized receivers of special type at subscriber points, without causing interference with the reception of concurrently-transmitted public broadcast programs of such stations by conventional receivers commonly in use by the general public.

The invention also contemplates the application of multiplex signals to an FM or television broadcast network incorporating a plurality of FM broadcasting stations as above described, and geographically arranged as a radio-relay chain to provide simultaneous transmission of multiplex and main (aural) program signals over a complete selected network in any desired relay progression irrespective of the relay linkage, if any, of the main program and without causing interference in the reception of aural or other programs in FM broadcast receivers or the FM sound receiving portion of television receivers within the service area of any of the stations in the network.

The present invention provides a large number of advantages and practical applications, among which are the following:

A program of aural, radioprinter or other form of intelligence, addressed to subscribers within the total service area of a group of FM broadcast stations, may be superimposed at ultrasonic frequencies on the main carrier of each FM station without causing interference with the main program transmission of the station in the range, say, between 30 and 15,000 cycles, and without requiring the addition of filter units in conventional broadcast receivers within the service area of the transmitter.

One or more subcarriers in the inaudible frequency range above 15,000 cycles may be superimposed on the carrier wave of an FM broadcast station without mutual interference between the two types of signals.

A subcarrier in the inaudible frequency range above 15,000 cycles may be superimposed on an FM broadcasting station in a radio-relay network and successively received and retransmitted continuously by each station along the selected relay links of the network, independent of the location of the source of the main aural program.

The direction of transmission of the multiplex program or programs along a radio-relay broadcast network may be controlled selectively from a central point, and similarly, the direction of transmission of the main aural program along the network may be selectively controlled from a central point.

Security of reception of subscription-radio programs of a given type free from intrusion by vocal announcements or other undesired signals may be attained at authorized subscriber receiving points and the reception of these programs of specific type rendered difficult or impossible by non-subscribers.

Selection of specific types of multiplexed subscription-radio programs, such as background music, news summaries, or business messages, may be attained at will at the subscription-radio receiver attuned to a single broadcasting station.

The invention is not limited to the transmission of aural or graphic intelligence, but is equally applicable to any remote control function, such as the control of remotely located machines and devices. As one example, it may be mentioned that signals suitable to control and operate engraving, accounting and computing machines may be transmitted by multiplex process in accordance with the invention.

Figure 1:
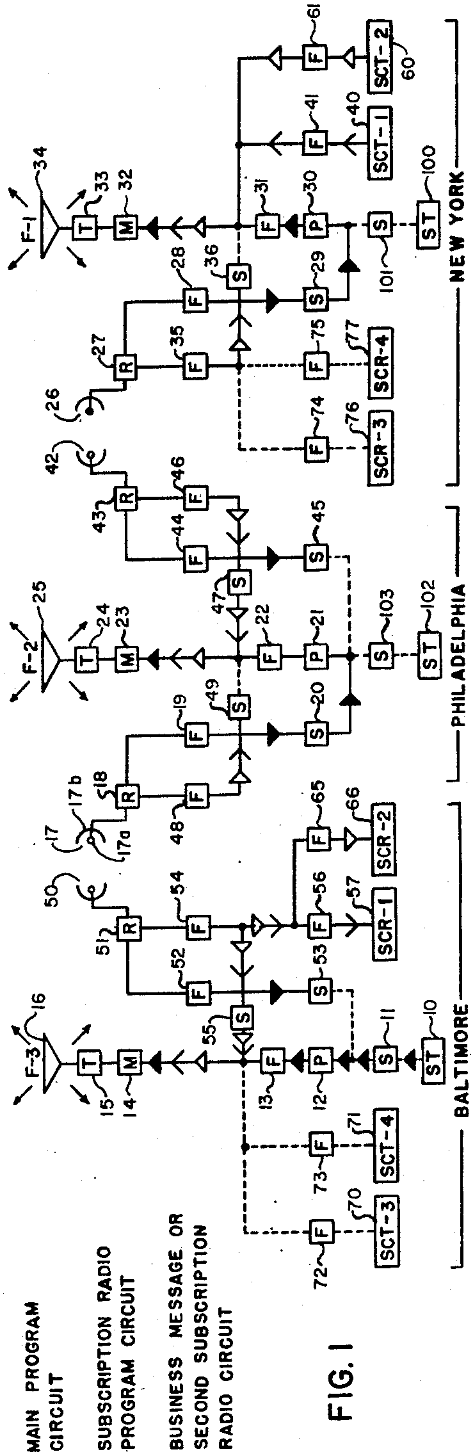
Fig. 1 is an illustrative block diagram of the multiplex broadcasting system of the invention showing progressive directional radio relaying along an FM or television broadcasting network of the main aural programs of a broadcast station in one direction, with simultaneous transmission of multiplex programs in an opposite direction.
Figures 5, 5A:
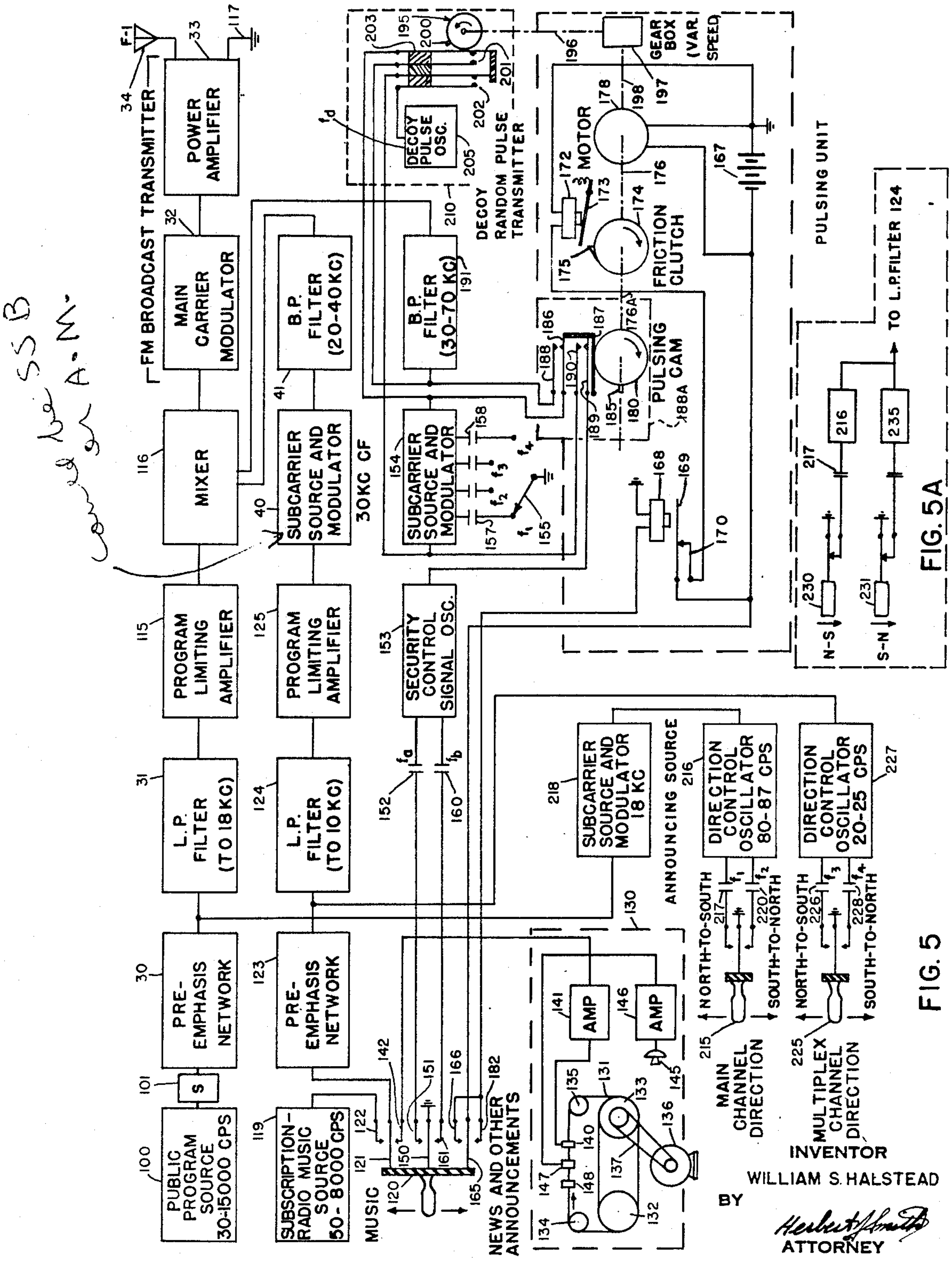

Fig. 5 shows, in combined block diagram and schematic circuit form, the means employed at the control transmitter of a radio broadcast station such as is illustrated in Fig. 1, to effect simultaneous transmission of a plurality of programs, and the means employed to effect remote control of direction of program transmission along the network from a control station, including the means employed to effect security of uninterrupted reception of subscription programs of specific type at subscriber receiving points, said subscription programs being devoid of vocal announcements.

Fig. 5A is an alternative arrangement of the direction control means of Fig. 5 to effect control of direction of program transmission from intermediate stations in a broadcast network.

Figure 6:
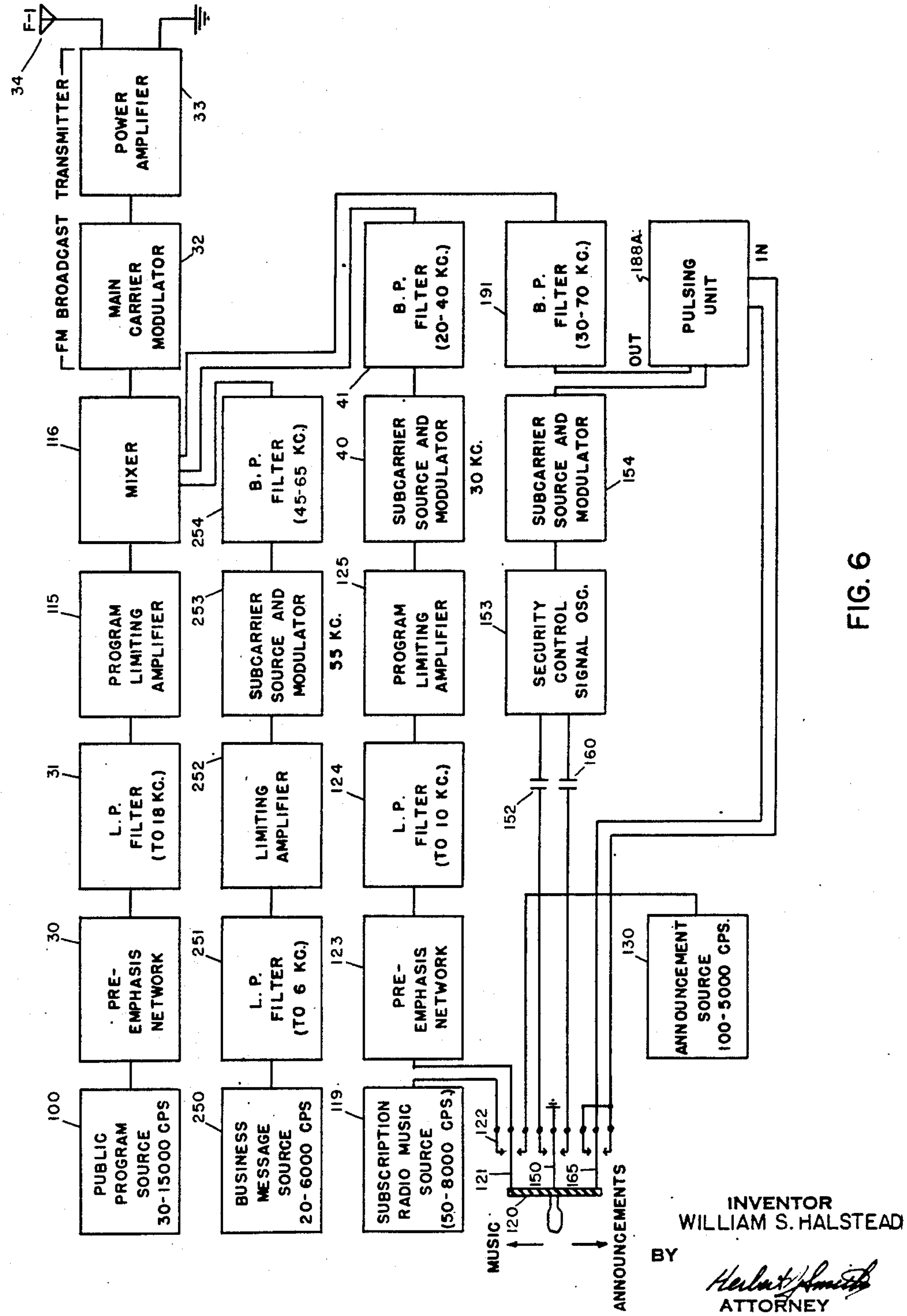

Fig. 6 illustrates in block diagram form an arrangement whereby three different types or sources of programs may be broadcast concurrently by an FM broadcast station on a common radio channel, with provision for a fourth source of program to be used alternately with one of the other sources.

Figure 7:
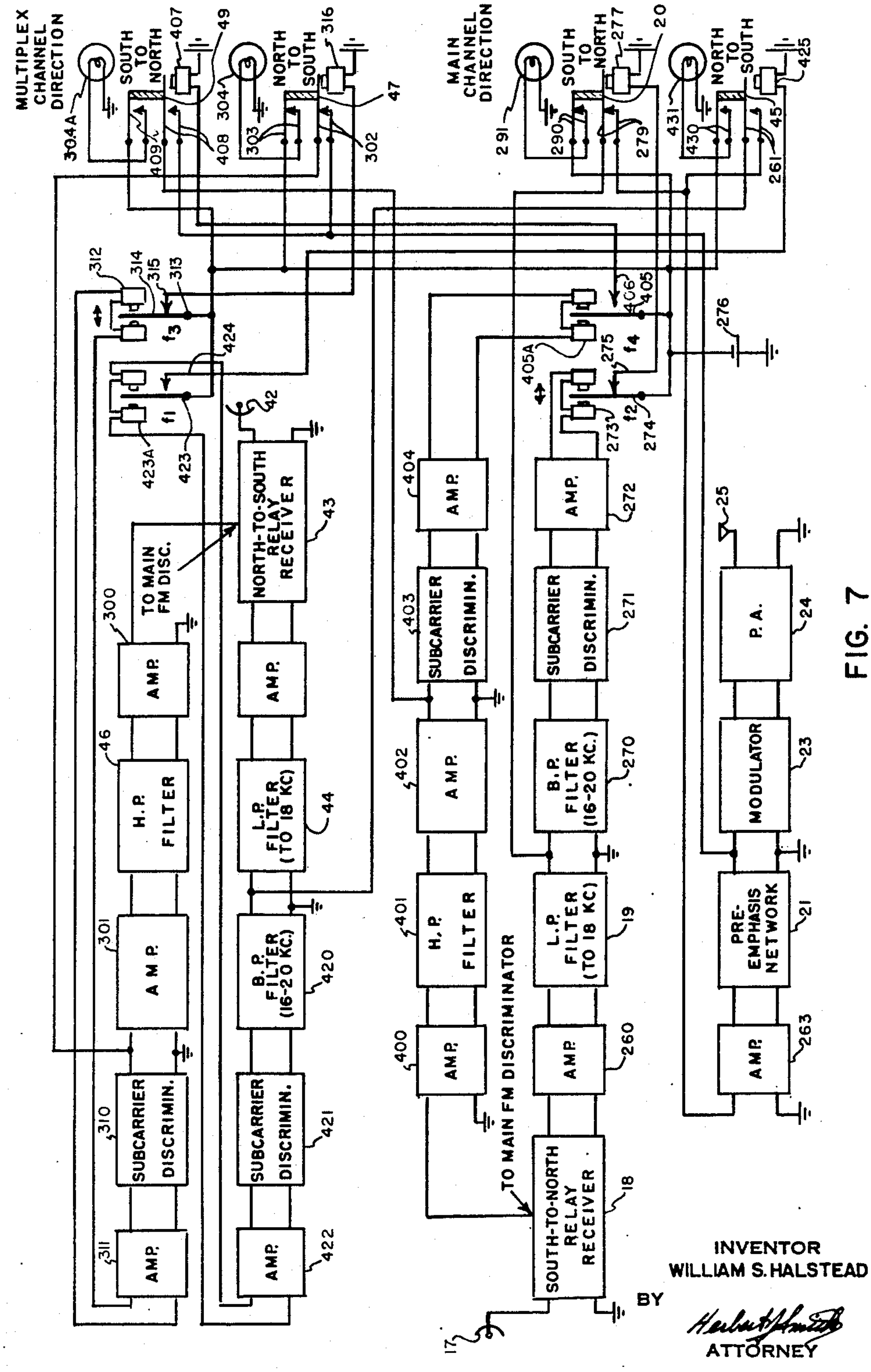

Fig. 7 is a combined block diagram and schematic circuit arrangement showing the means employed at intermediate relay stations of a broadcast network of radio relay type in effecting selective control of direction of transmission of the main program signals and the multiplex program signals.

Figures 8, 9:
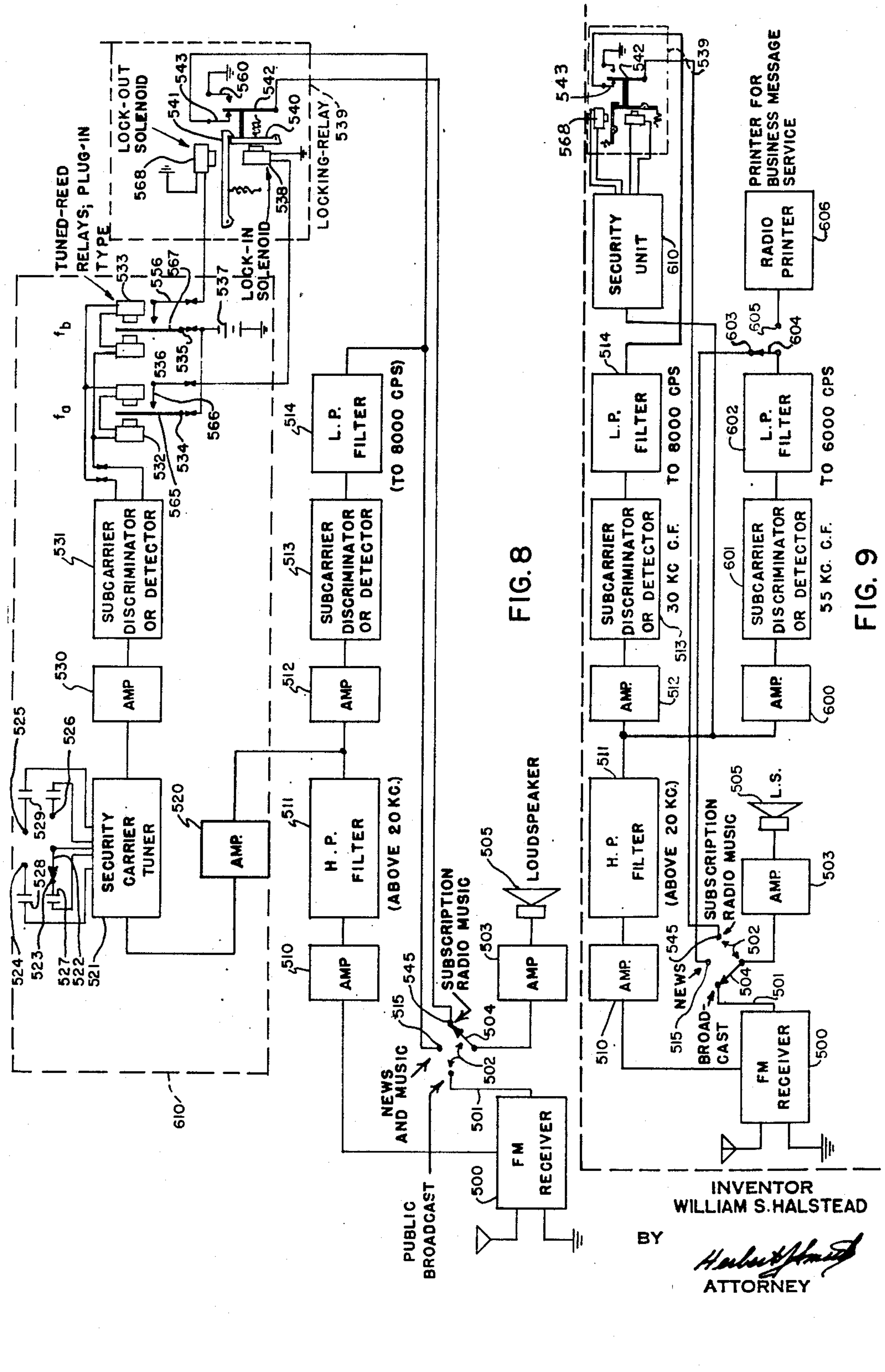

Fig. 8 is a combined block diagram and schematic diagram showing an arrangement of circuits and control components in a subscription radio receiving device whereby security of uninterrupted reception of a specific type of program, such as music, is made possible only at authorized receiving points.

Fig. 9 is similar to Fig. 8 except that additional means are shown whereby a second multiplex program of specific type may be selected at a subscription radio receiving point, with means for reproducing the signals received on the subscription radio subcarrier channel either by sound reproducing means or by graphic or other signal reproducing means.

Figure 10:
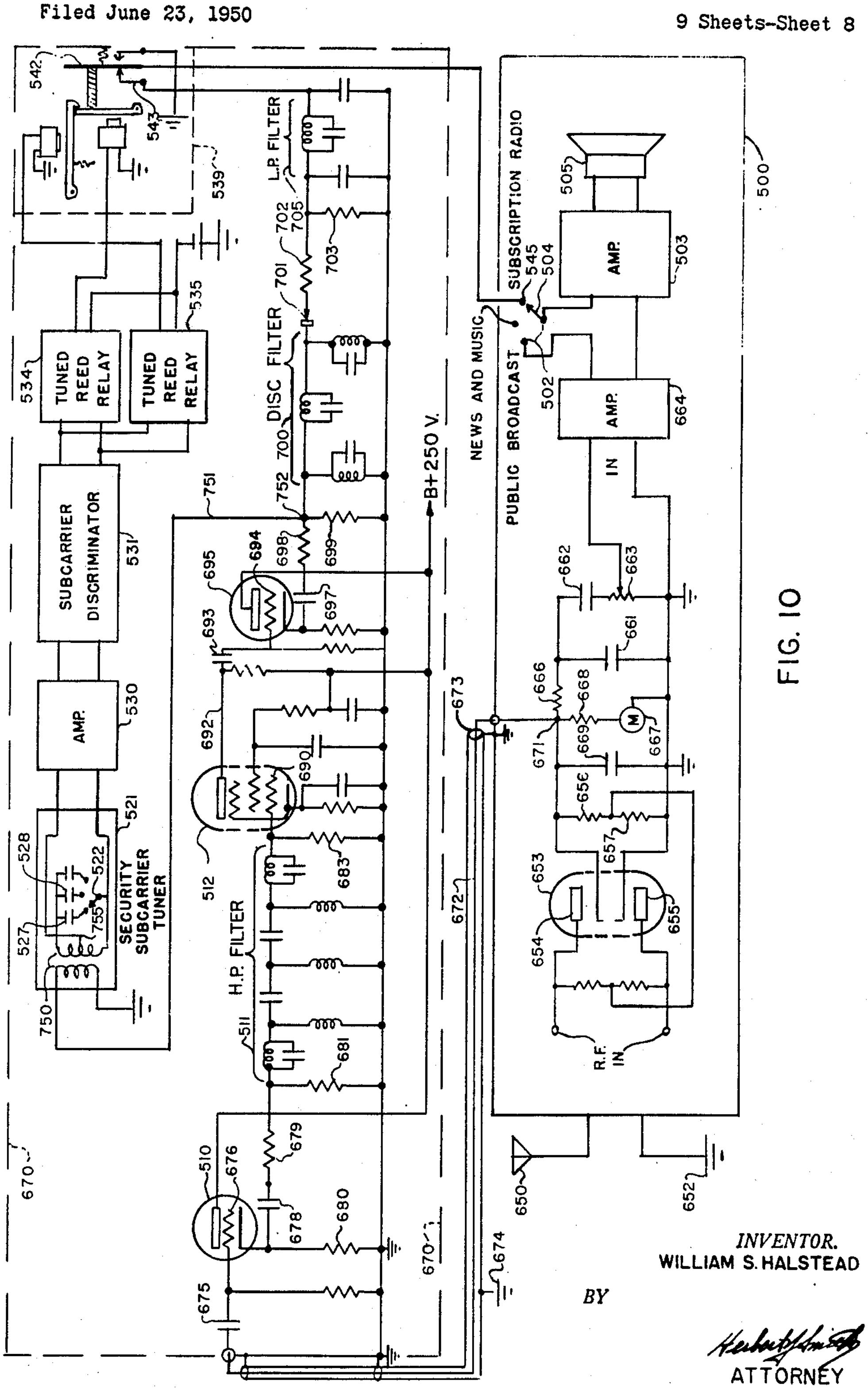

Fig. 10 shows in further detail the circuits and components employed in an illustrative arrangement of subscription-radio receiver whereby security of uninterrupted reception of special musical programs addressed to subscription radio receiving points is attained including one form of subcarrier discriminator used with the system of the invention.

Figure 11:
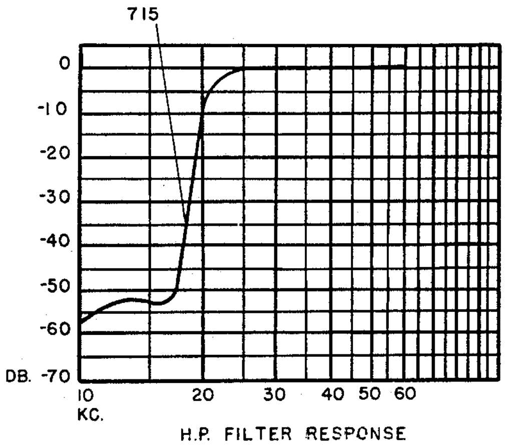

Fig. 11 illustrates a representative response curve of the high-pass filter utilized in the diagram of Fig. 10.

Figure 12:
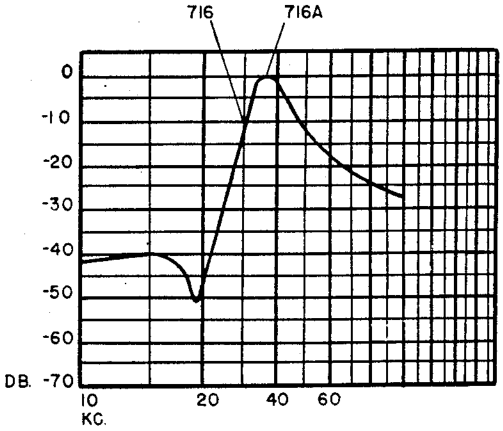

Fig. 12 represents the *response characteristics of the* subcarrier discriminator filter shown in Fig. 10.

Figure 13:
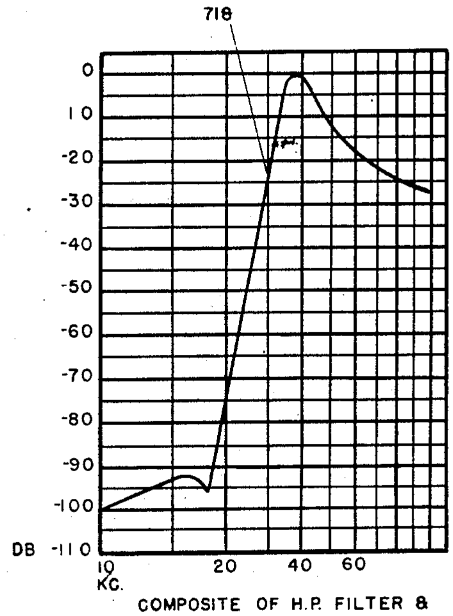

Fig. 13 is a composite of the response characteristics of the high-pass filter and discriminating filter shown in Fig. 10.

Referring to the block diagram of Fig. 1 setting forth an arrangement of the basic multiplex broadcasting system of the invention, the main (aural) program of an FM or television broadcasting station, lying within the audio frequency range of 30–15,000 cycles per second is supplied from a studio 10, located for purposes of illustration in an urban center such as Baltimore. The main aural program signals pass through a switching means 11, which may be manually controlled at the location of the station or which may be remotely controlled from a central point as will be described hereinafter.

From the switching means, the main aural program signals are applied to a standard pre-emphasis network 12 in accordance with standard FM broadcasting practice. After pre-emphasis, the main aural program signals are passed through a low-pass filter 13 having a response characteristic such that it will pass without attenuation the main program signals within the audio-frequency range up to 15,000 cycles per second. Thereafter, the main aural program signals are applied to the modulator section 14 of an FM broadcast-transmitter and power amplifier 15. This transmitter may also be the FM sound transmitter associated with a television station. The radio wave is thereupon radiated by omnidirectional antenna 16 at a main carrier frequency F3. The broadcast signals, as radiated by antenna 16, are picked up by a uni-directional receiving antenna 17, located at a cooperating network station in an adjoining city, such as Philadelphia (see Figs. 1 and 4 inclusive), which is within the effective transmitter range of transmitter 15 in Baltimore. The unidirectional receiving antenna may comprise a horizontal dipole 17A, as schematically represented in end view, and reflector 17B, or may be of any other suitable well-known type. This receiving antenna 17 is directed toward the transmitting antenna 16 of the Baltimore station in order that a signal of optimum strength may be received from the Baltimore station.

Radio frequency signal energy from antenna 17 is applied to an FM broadcast receiver 18, the audio frequency output, in the range 30–15,000 cycles, being applied through a low-pass filter 19 to a switching means 20, which may be locally or remotely controlled, as will be described hereinafter. When closed the switching means 20 functions to apply the main aural program signals to the input of pre-emphasis unit 21, thence through low-pass filter 22 effective in passing without attenuation, the aural-program signals in the range of 30–15,000 cycles. The audio frequency signals are then applied to the modulator 23 of its associated FM broadcast transmitter 24. Radio wave energy from transmitter 24 is applied to omnidirectional antenna 25 at a main carrier frequency F2.

The broadcast signals from the Philadelphia station are picked up by unidirectional antenna 26, located in an adjoining service area, such as New York city. Radio frequency energy from antenna 26 is applied to receiver 27. The received aural program signals in the range 30–15,000 cycles are then passed through low-pass filter 28 to switching means 29, which when closed either manually or automatically from local or remote points, applies the aural program signal energy to the pre-emphasis unit 30, thence through low-pass filter 31 to the modulator 32 associated with FM broadcast transmitter 33. The radio frequency output of transmitter 33 is applied to omnidirectional antenna 34 and is radiated in all directions to serve the New York city area.

In the manner described previously above, the course of main aural program transmission is shown throughout the network of three stations in the cities of Baltimore, Philadelphia and New York (see Figs. 1–4 inclusive), with the main aural program originating at a studio in Baltimore.

Concurrently with the northward transmission of the main program from Baltimore to New York, one or more additional aural programs of "subscription-radio type", which cannot be heard by the general public with existing broadcast receivers, are being transmitted by ultrasonic multiplex method from a special studio in New York southward along the network to Baltimore, simultaneously providing a specialized program service to subscribers located at any point within the total service area of any of the three stations.

Referring to the block diagrams in Figs. 1 and 2, the subscription-radio program originates at an ultrasonic or multiplex transmitting source 40, designated as subcarrier transmitting unit SCT–1, in which an inaudible subcarrier at a frequency above 20 kilocycles is modulated by music or other audio frequency signals from a subscription-radio program source forming a part of the transmitting components designated as source 40, as will hereinafter be explained in detail by means of subsequent figures. The subscription-radio subcarrier is passed through band-pass filter 41, which is effective in passing only the subcarrier frequency range between 20 and 40 kilocycles and rejecting all frequencies below and above this range. The subcarrier, having a center frequency of 30 kilocycles, in instances where an FM subcarrier is used, is thereafter applied directly to the input of modulator 32, as will be described in detail hereinafter associated with FM broadcast transmitter 33.

It is evident from the foregoing that the radio frequency output of broadcast transmitter 33 is modulated by two signals, one, the main aural program signal within the audio frequency range between 30–15,000 cycles and, second, the inaudible subcarrier modulated by the special subscription-radio program signals, within the audio frequency range between 30 and 8,000 cycles, for example.

The main carrier of the New York FM broadcasting station, at carrier frequency F1, is picked up by unidirectional receiving antenna 42, located at or near the broadcasting station in Philadelphia, and radio frequency signal energy from the New York station thus is applied to FM receiver 43.

The received aural program signals in the range between 30 and 15,000 cycles flow from the audio output of receiver 43 through low-pass filter 44 as far as switching means 45. In this instance, since the direction of transmission of the main aural program is from south to north, that is from Baltimore to New York, the switching means 45 is kept in the "open" position by local or remote control as will be described hereinafter, thereby preventing the main aural program from being re-applied to the broadcast transmitter 24 in Philadelphia.

Receiver 43 has a second output circuit leading from its FM discriminator for use with the subcarrier receiving circuits as will hereinafter be described in detail. This secondary or subcarrier output circuit is connected to a high-pass filter 46 which is effective in passing only the inaudible subcarirer frequencies above 20 kilocycles. The main aural program signals in the range 30–15,000 cycles are attenuated sufficiently by the filter so that they cannot pass through this filter unit as effective signal energy. The inaudible subcarrier signals in the range between 20 and 40 kilocycles then are applied through switching means 47, in the "closed" position to the modulator 23, associated with broadcast transmitter 24, and are thereafter radiated as modulating components of the emitted wave.

Unidirectional antenna 50, located at or near the broadcasting station in Baltimore, is employed in picking up radio frequency carrier wave energy from the Philadelphia station and applying this carrier energy to FM receiver 51. The main aural program signals from this receiver 51 are passed through low-pass filter 52 to switching means 53, and are prevented from being applied to the modulator 14 of Baltimore broadcast transmitter 15 because of the "open" position of switching means 53.

The inaudible subcarrier signal in the range between 20 and 40 kilocycles is applied through high-pass filter 54 which blocks the main aural program signal and allows the inaudible subcarrier signal to pass to switching means 55 in the "closed" position, thence to the modulator 14 associated with broadcast transmitter 15. Thus it will be seen that the main aural program transmission is northward, while, at the same time, the inaudible subscription radio signal is being transmitted southward along the same network without interference between the two types of signals.

The inaudible subcarrier signals after reception at the Baltimore station, may be monitored by suitable subcarrier equipment, including band-pass filter 56 and a subscription radio receiver 57 designated as SCR–1, employed as a monitor receiver at the Baltimore station.

It will be noted that in the subcarrier relay process, no demodulation of the subcarrier is required, the subcarrier being relayed without change in envelope from station to station.

In the manner described in the preceding paragraphs, one or more additional subcarrier signals, such as a specialized news summary addressed to business firms, or radio-printer signals from a source designated as "business message" source 60, designated as SCT–2, or a second subscription music program, may be transmitted concurrently to the south along the network without interfering with either of the two programs previously mentioned. This second subcarrier, which may be in the frequency range between 45 and 65 kilocycles for example, is applied from source 60 designated as SCT–2, to band-pass filter 61 and thence is impressed on the input of the modulator 32, transmitter 33, and radiated by antenna 34 at the New York station.

At Philadelphia, receiving antenna 42 and receiver 43 are used as has been described previously. The "business-message" signal, in the frequency range 45 to 65 kilocycles, is applied through high-pass filter 46 to "closed" switching means 47, and thence to the modulator 23, transmitter 24, and subsequently being radiated at main carrier frequency F2 by the antenna 25 at the Philadelphia station. At the Baltimore station, the "business message" subcarrier, in similar manner, is received by receiver 51, passed through high-pass filter 54, switching means 55, modulator 14 and its associated transmitter 15, with subsequent radiation by antenna 16.

For monitoring purposes, the "business message" signal is applied through band-pass filter 65 to the "business message" receiver 66, which may have means for reproducing the "business message" in aural form, or in graphic record form as with a radio printer, teletype or other suitable well-known device.

It will be noted, in connection with the relay transmission of the inaudible subcarrier at the Baltimore station that the subcarrier in the frequency range between 20 and 40 kilocycles is received at the Philadelphia station via antenna 17 and receiver 18, then is passed through high-pass filter 48 but is prevented from being re-applied to the modulator 23 of broadcast transmitter 24 by the "open" position of switching means 49.

In a manner similar to that described in the preceding paragraphs, subcarrier signals may originate from subcarrier transmitters 70 and 71, designated as SCT–3 and SCT–4 respectively, at the Baltimore station should it be desirable to transmit subcarrier signals northward in lieu of southward. In this case, these subcarriers may have the same frequencies as those employed by the southbound subcarriers or different frequencies. Subcarrier signal energy from subcarrier transmitter 70 is passed through filter 72 to the modulator 14 of the transmitter 15 in this illustrative arrangement, while subcarrier signals from the subcarrier transmitter 71 are passed through the filter 73 as indicated.

At the New York station, these subcarrier signals are selectively received after the passage of each subcarrier through its respective band-pass filter with band-pass filter 74 in New York being used for the signal from subcarrier transmitter 70 in Baltimore and band-pass 75 in New York being used in conjunction with subcarrier transmitter 71 in Baltimore, with separate subcarrier receivers SCR–3 and SCR–4, 76 and 77, in New York, associated respectively with each of these two subcarrier channels.

It should be noted that the two subcarriers, one in the frequency range between 20 and 40 kilocycles, and the other in the range between 45 and 65 kilocycles are permitted to flow through the high-pass filters such as 48 and 46 without selective attenuation or discrimination, as between the two subcarriers and without demodulation of the subcarriers.

Figure 2:
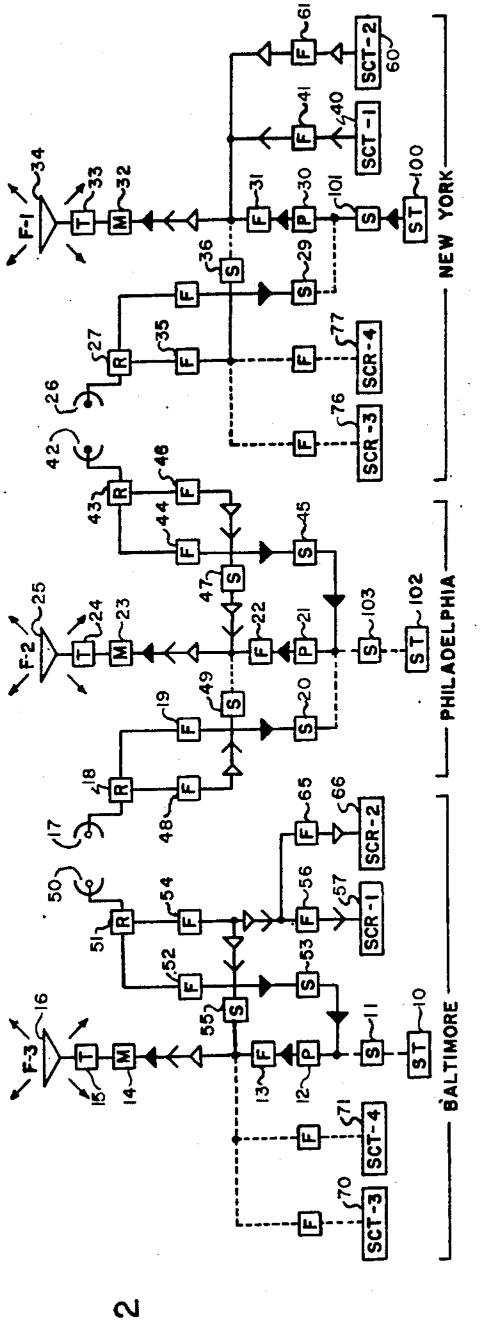
Fig. 2 is similar to Fig. 1 except that, in this instance, the main program of a broadcast network and the multiplex programs are relayed in the same direction through the same broadcasting network as represented in Fig. 1.

The diagram of Fig. 2 illustrates the method of reversing the direction of transmission of the main aural program to permit distribution along the network from north to south between New York and Baltimore, without affecting the southward flow of the two inaudible subcarrier programs.

In this instance, the main aural program originates at a broadcast studio 100, located in New York city.

The main aural program signals, in the frequency range between 30 and 15,000 cycles, are applied through switching means 101 to the pre-emphasis network 30. The main aural program signals then flow through low-pass filter 31 without attenuation and are applied through modulator 32 to transmitter 33 and are radiated by omnidirectional transmitting antenna 34 at a main carrier frequency F1. The subscription radio program signals modulating an inaudible subcarrier in the range between 20 and 40 kilocycles, originating at subcarrier transmitter 40, are applied to modulator 32 through band-pass filter 41 as has been described previously in connection with Fig. 1. Similarly the "business message" signals from source 60 modulating a subcarrier in the inaudible frequency range between 45 and 65 kilocycles flow through band-pass filter 61 to the modulator 32 as has also been described in connection with Fig. 1. The radio wave energy from the New York station is picked up by directional receiving antenna 42 located at or near the Philadelphia broadcast station, and is applied to receiver 43. The received aural program signals within the range 30 and 15,000 cycles flow without attenuation through low-pass filter 44 and are applied through switching means 45, which may be locally or remotely controlled, to the pre-emphasis network 21. The main aural program signals after pre-emphasis flow through low-pass filter 22 and are applied to modulator 23 and thereby cause modulation of the radio frequency output of transmitter 24, with radiation of wave energy by omnidirectional antenna 25 at a broadcast carrier frequency F2.

The inaudible subcarrier signals conveying the subscription radio program and the "business message" signals flow through high-pass filter 46, associated with the FM discriminator circuit of receiver 43, as will be described in further detail in subsequent paragraphs. The subcarrier signals then are applied through switching means 47, in "closed" position, to the modulator 23 of the FM broadcasting transmitter 24, with transmission of both subcarrier signals as modulating components of the electric wave radiated by antenna 25 at main carrier frequency F2.

The signals transmitted by the Philadelphia station are picked up by directional antenna 50, located at or near the Baltimore broadcast station, and are applied to FM broadcast receiver 51, the audio output of which is connected with low-pass filter 52 which passes the main aural program within the frequency range 30 to 15,000 cycles. Through closure of switching means 53, the main aural program signals are applied to pre-emphasis unit 12 then through low-pass filter 13 and thence to the modulator 14 associated with FM broadcast transmitter 15. The radio frequency energy from transmitter 15 is radiated by omnidirectional antenna 16 to all points within the service area of the Baltimore station. The inaudible subcarrier signals are supplied from the FM discriminator of receiver 51 through high-pass filter 54 and switching means 55 to the modulator 14 associated with transmitter 15, thereby causing the concurrent transmission of the inaudible subcarrier signals throughout the service area of the Baltimore broadcasting station.

It will be noted by comparison between the block diagrams of Fig. 1 and Fig. 2 that in the latter it is indicated that switching means 20 at the Philadelphia station is in the "open" position while in Fig. 1, switching means 20 is in the "closed" position and may be controlled by local or remote means to be described hereinafter. In each case the relay program signals are kept from being re-applied to transmitter 24 at the Philadelphia station.

In the manner described in the above paragraphs in connection with description of Figs. 1 and 2, it will be apparent that, by controlled manipulation of the various switching means at each station such as 20, 45, 49 and 47 and through the frequency selection afforded by the various filters at each station, such as 48, 19, 44 and 46, which separate the main aural program signals from the subcarrier signals, the direction of transmission of either type of program along the network may be changed at will. For example, the main aural program serving the entire radio relay network may originate at Baltimore, Philadelphia or New York at various times during a day without in any manner affecting the flow of the subcarrier signals from a fixed source, such as the New York station. Likewise, the direction of transmission of the subcarrier signals along the network may be reversed at will or may originate at any station in the network, as determined by controlling personnel. Means will be described in subsequent paragraphs illustrative of centralized control of direction of program transmission whereby the direction of transmission of the main aural program, for example, may be controlled from a terminus point at either end of a network, or from any single station in the network, thus remotely effecting opening and closing of switching means such as 47 and 45, located at the Philadelphia relay broadcasting station, by inaudible control signals transmitted from a control point at the New York broadcasting station, in this example.

In the event of origination of the main aural program at an intermediate station in a network, such as that at Philadelphia, switching means 103, associated with studio 102, Fig. 1, is closed and audio frequency signals within the frequency range between 30–15,000 cycles are applied to the pre-emphasis network 21 and thereafter broadcast from transmitter 24, as has been previously described. In this instance, switching means 45 at the Philadelphia station is placed in the "open" position thus preventing the concurrent application of aural program signals received from the New York station from being applied to the broadcast transmitter 24 at Philadelphia. It will be noted that operation of the switches 103 and 45 have no effect upon continued transmission of the inaudible subcarrier carrying the subscription radio program and the "business message" signals, which continue to flow through switching means 47 to the transmitter 24. In this instance, as will be described in further detail in subsequent paragraphs, inaudible directional control signals transmitted from the Philadelphia station may be employed to automatically cause the operation of designated switching means at the New York and Baltimore stations to cause relay transmission of the Philadelphia program by either the New York or Baltimore stations or by both stations as may be determined by the control personnel at Philadelphia or either of the two outlying stations.

In the event that each station is to originate and transmit its own public broadcast program, on a non-network basis to local listeners, within the range 30–15,000 cycles, the switching means 101, Fig. 2, at the New York station is placed in the "closed" position thereby applying the aural program signals to transmitter 33. Switching means 29 and 36 at the New York station are retained in the "open" position, as shown in Fig. 2. At the Philadelphia station, the aural program signals from the local studio 102 are applied by the closure of switching means 103 to the input of broadcast transmitter 24. Switching means 45 is opened, as in Fig. 1, to prevent the application of the aural program signals from the New York station being applied to the Philadelphia transmitter 24. Switches 20 and 49 are also kept in the "open" position, as indicated in Fig. 2, to prevent signals from the Baltimore station from being applied to broadcast transmitter 24. Switching means 47, however, is kept in the "closed" position to permit uninterrupted network relay transmission of the inaudible multiplex subcarrier signals as received from New York.

At the Baltimore station, aural program signals from the local studio 10 are applied through closure of switching means 11 to the broadcast transmitter 15, as in Fig. 1. Switching means 55 is kept in the "closed" position to maintain uninterrupted relay transmission of the multiplex subcarrier signals as received from the Philadelphia station. Switching means 53 is opened, as in Fig. 1, to prevent the retransmission of the aural program signals received from the Philadelphia station.

In the latter example of the operations of the system of the invention, it is evident that the three broadcast stations, each providing its own local broadcast service to the public in three principal marketing areas are enabled to provide programs of local interest to their respective local audiences, while at the same time the stations function together as an integrated broadcasting network in distributing subscription radio programs and "business message" services on an inaudible multiplex basis, insofar as the general public is concerned, without in any manner causing interference with the public broadcast programs of any of the stations. Likewise, the public broadcast programs cause no interference with the network transmission of the subscription radio programs and the "business message" services.

Figure 3:
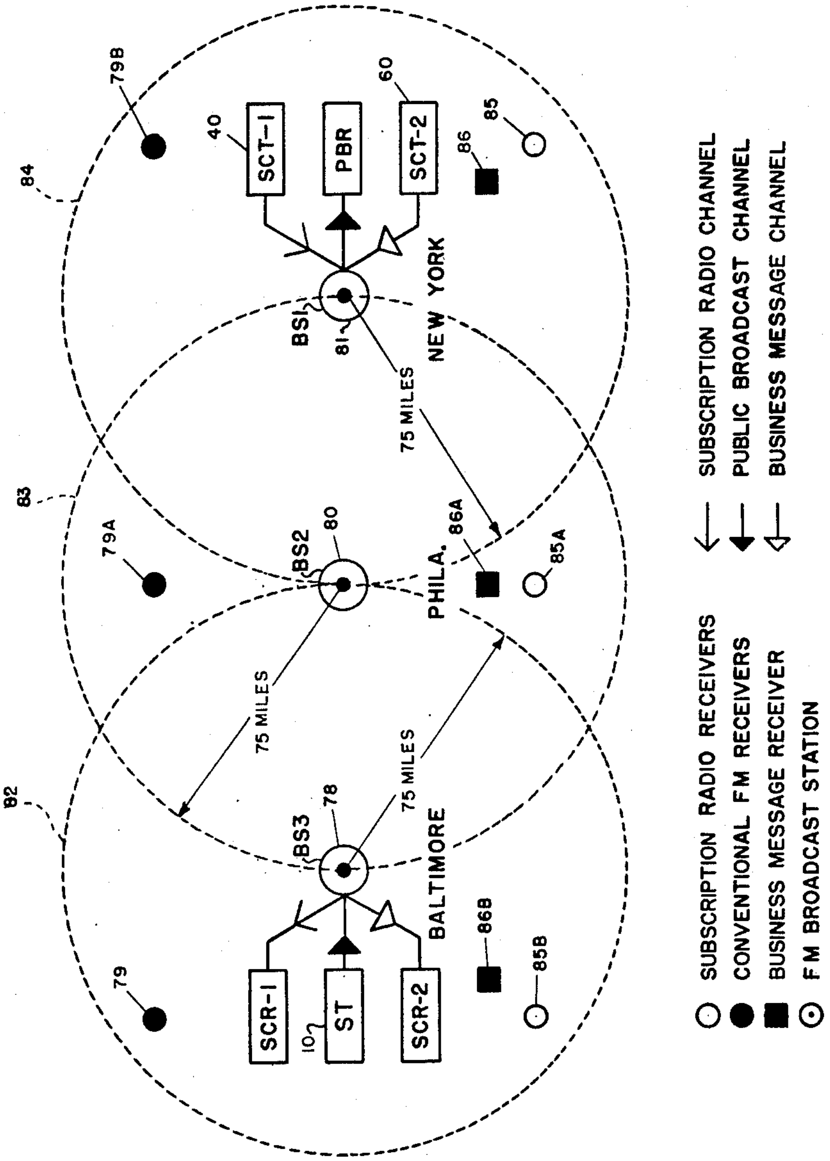
Fig. 3 represents in simplified, schematic plan view the general relay arrangement shown in Figs. 1 and 2 illustrating the manner in which each station serves its respective area, with the network stations transmitting the main aural program in one direction while the multiplex programs are transmitted in the opposite direction.

The general broadcast network arrangement whereby the north-bound main aural program is disseminated throughout the total service area of the three stations for public broadcast reception by means of conventional FM broadcast receivers, and the south-bound subcarrier programs are disseminated throughout the total service area to subscription radio receiving points at any point in the area, is shown in simplified schematic plan-view form in the diagram of Fig. 3.

In Fig. 3, the main aural program is transmitted from the studio in Baltimore, identified in this instance as the block 10 marked "ST", throughout the entire area served by the Baltimore station identified as 78, marked with the legend "BS3". This main aural program within the range of 30–15,000 cycles, as has previously been described, may be picked up by conventional FM receivers, such as 79, located at any point within the broadcast service area of the Baltimore station by the means previously described in connection with Figs. 1 and 2. The main aural program signals are received and re-transmitted at another carrier frequency by the Philadelphia broadcasting station 80 identified as "BS2". This re-transmitted or relayed aural program originating in the Baltimore studio may be picked up by conventional FM receivers such as 79A located at any point within the broadcast service area of the Philadelphia station.

In the manner described in connection with Fig. 1, the main aural program signals are received at the New York broadcasting station 81 identified as "BS1" and relayed at a carrier frequency different from that of the Philadelphia station thereby enabling conventional FM broadcast receivers such as 79B to be used in receiving the program originating at the Baltimore studio. The effective service area of each of the broadcasting stations BS3, BS2 and BS1 insofar as radio relay operation is concerned is shown by the dotted circles 82, 83 and 84 respectively. In normal practice, the radius of each of the three theoretically circular service areas may range from 40 to 100 miles, depending on terrain conditions between the stations, elevation of the stations, etc.

The concurrent use of this FM broadcast network in distributing my multiplex method the subscription radio programs and a special "business message" program with these special programs being transmitted from New York to Baltimore along the network, is shown in simplified schematic form in Fig. 3.

The subscription-radio program signals modulating an inaudible subcarrier of given frequency, as has been described in connection with Fig. 1, originate at a subscription radio transmitting source 40 indentified as "SCT–1." This inaudible subcarrier at specified subcarrier frequency is transmitted by the New York station 81, enabling reception of the subscription radio program by special subscription-radio receivers, such as 85, located at any point within the broadcast service area of the New York station.

By means of the technique illustrated in Fig. 1, the inaudible subcarrier is relayed by the Philadelphia station 80 thereby effecting transmission of the subscription-radio program to special receivers such as 85A located at any point within the broadcast service area of the Philadelphia station. After relay transmission to the Baltimore station 78, as has been described in connection with Fig. 1, the subscription-radio signals are re-transmitted by the Baltimore station 78 to special subscription-radio receivers such as 85B, located at any point within the normal broadcast service area of the Baltimore station.

Similarly "business message" signals, which may be of voice characteristic or teleprinter type may be transmitted from the "business message" source 60 identified as "SCT–2" connected with the New York station 81. The "Business message" signals, modulating an inaudible subcarrier of given frequency and different from that employed by the subscription radio program signals, as has been described in connection with Fig. 1, are applied to the broadcast transmitter at the New York station 81 and thereafter broadcast in all directions to special "business message" receivers, such as 86, located at any point within the FM broadcast range of the New York station 81.

In the manner described hereinabove, the "business message" signals are received and re-transmitted by the Philadelphia station 80 located at Philadelphia and may be received by special "business message" receivers 86A located at any point within the normal broadcast service range of the Philadelphia station 80.

Again, in the same manner, the "business message" signals originating at the New York station, are received from Philadelphia at the Baltimore station 78, and re-transmitted to special "business message" receivers such as 86B located within the normal service range of the Baltimore station.

In the manner as has been described and by reference to the contours 82, 83 and 84, it will be evident that an extremely large total service area consisting of the combined broadcast service areas of the group of three stations serving three principal cities of the United States may be provided with three different types of program services at the same time, using conventional FM broadcast transmitters, and broadcast receivers now in operation, without interfering with the main aural program transmissions of the stations, which may be operated together as a network as has been described or which may be operated individually insofar as the transmission of the main aural program signals are concerned. In either event, there is no interference with the flow of subscription radio programs or special "business message" traffic on the subcarrier channels. It is important to point out, as will be described in detail in subsequent paragraphs, that no operating difficulties are introduced at any station of the network by the concurrent transmission of one or more inaudible subcarriers, and such transmissions are confined within the present channel widths or frequency deviation allocated to standard FM broadcast stations by the Federal Communications Commission. It also is important to point out that this technique offers apparent advantages with respect to efficiency in channel utilization and in low operating and maintenance costs for the reason that no duplication of FM broadcast transmitting equipment is required in order to handle one or more special programs concurrent with the main aural program of each of the stations.

Figure 4:
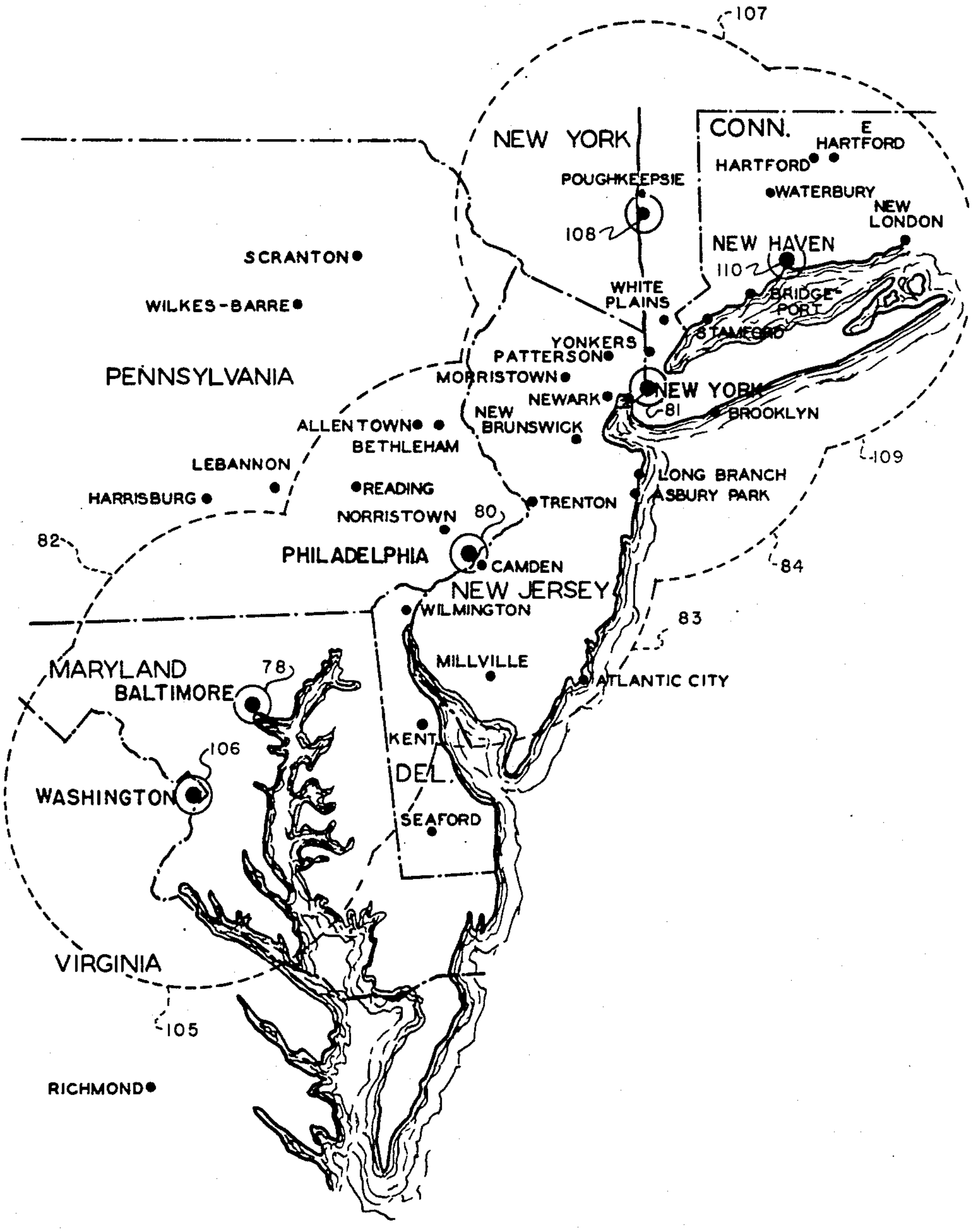
Fig. 4 represents the relative great geographical area embraced in the operation of the system of the invention, with the service areas of the various stations combining to form a continuous area or envelope extending throughout the overlapping service areas of all the stations.

Referring to Fig. 4, the map therein portrayed sets forth the potential broadcast and subscription radio service capabilities of the multiplex broadcast system of the invention in covering the most densely populated areas of the middle-Atlantic coastal region by a total of six FM or television broadcasting stations located in the cities of New York, Poughkeepsie, New Haven, Philadelphia, Baltimore and Washington. The dotted line 84 represents the outer service contour of the New York broadcasting station 81; the dotted line 83 represents the outer service contour of the Philadelphia broadcasting station 80, while the dotted line 82 represents the outer service contour of the Baltimore broadcasting station 78, as represented heretofore in Fig. 3. The dotted line 105 represents the outer service contour of a broadcasting station 106 located at Washington D. C. The dotted line 107 represents the outer service contour of a broadcasting station 108 located in the vicinity of Poughkeepsie, New York, while the dotted line 109 represents the outer service contour of a broadcasting station 110 located at New Haven.

Inasmuch as the service zones of the stations in adjacent geographical areas overlap, it is apparent that the envelope comprising the periphery of the total service area embraces a very large geographical area including a substantial percentage of the total population of the United States.

The system of the invention will make it possible for broadcast listeners within this total broadcast area to obtain static-free undistorted reception of programs from a designated studio within the total service area without the use of telephone lines joining the transmitting stations or the use of separate radio facilities to join the stations together. In addition, and without interfering with the public broadcast reception of high-fidelity aural programs signals within this total service area, one or more subscription radio programs may be transmitted to subscribers at any location within the total service area; or a "business message" service and other special programs may concurrently be transmitted to business houses, governmental bureaus or other designated receiving points within the total service area, employing the basic network of six standard FM broadcast transmitters or television sound transmitters in effecting this comprehensive geographical coverage of an important area of the United States.

In this connection, it is stressed that actual operating tests have demonstrated that there is no interference with the reception of high-fidelity aural program of public broadcast type within the frequency range of 30–15,000 cycles when employing conventional FM broadcast receivers of various types now in the hands of the general public. In other words, no special filters or additional parts whatsoever are required at broadcast receiving points in order to maintain interference-free reception of the high-fidelity aural program signals as broadcast to the public. Moreover, the general public cannot hear the subcarrier programs unless special receiving equipment is employed, and there is no indication of such supplementary programs being broadcast by the stations in each area insofar as the general public is concerned.

To make it difficult or impossible for the general public to receive uninterrupted music of the subscription radio type, free of announcements and other vocal intelligence, means are incorporated in the system of the invention whereby the security of uninterrupted reception of subscriber radio musical programs is maintained at authorized receiving points. This permits the establishment of a broadcast program service having specialized types of programs such as semi-classical music, symphony music, etc., on a fee basis in lieu of commercial sponsorship of broadcast with their accompanying announcements as is conventional practice at the present time throughout the United States for the purpose of providing revenue to the broadcasting stations.

The means employed in the present invention to provide security of non-interrupted reception of musical programs, without vocal announcements except when desired by the subscriber, will be described in subsequent paragraphs.

The diagram of Fig. 5 illustrates in block diagram and schematic form the means employed at the control station of the radio-relay network to effect simultaneous transmission of the public aural broadcast program and the subscription radio musical programs interspersed with recurrent news bulletins or other information together with security and decoy pulses. The diagram also illustrates the means used to effect transmission of directional control signals whereby the direction of transmission of the main aural program and the multiplex program along the network may be established from the control station. Thus, Fig. 5 illustrates in detail a preferred type of equipment which may be included in any of the three sections generally represented in Figs. 1 and 2.

The diagram of Fig. 5 specifically sets forth a presently preferred arrangement whereby security control signals may be transmitted automatically as short pulses in proper sequence from the control station to attain security of uninterrupted reception of music or other selected subscription radio programs at subscriber receiving points only. The security control signaling means is inclusive of a "decoy-pulse" transmitter having as a purpose the confusion of unauthorized persons who may attempt to ascertain the exact characteristics of the security-control pulses. The "decoy pulse" also causes improper operation of unauthorized subcarrier receiving equipment whereby it will be difficult or impossible for these unauthorized subcarrier receivers to maintain uninterrupted reception of the selected type of program for any substantial length of time. This subject matter is specifically claimed in divisional application Ser. No. 179,195, filed August 14, 1950.

Referring in detail to Fig. 5, aural program signals from a studio or other broadcast program source 100 (identical to the program source 100 of Fig. 2) and within the audio frequency range 30–15,000 cycles are applied through switching means 101 to pre-emphasis network 30; thence through low-pass filter 31, effective within the audio frequency range up to 18,000 cycles without attenuation to a program limiting amplifier 115, of any suitable well-known type, which may be employed to automatically maintain the level of the program signals within a predetermined operating ceiling, as regulated by a manual adjusting device which is normally a component of such limiting amplifiers. The aural program signals are then applied to a conventional mixer 116 of any well-known type, the purpose of which is to permit application of signals from different sources to a common amplifier input circuit without disturbing the impedance relationship of any of the circuits and to permit independent regulation of the signal levels in either of the input channels as may be desired by an operator. The aural program signals are then applied to the main carrier modulator 32, which causes frequency modulation of radio wave energy at the output of transmitter or power amplifier 33 which supplies radio frequency energy at carrier frequency F1 to the antenna 34, with ground connections shown at 117.

The subscription radio music program within an illustrative audio frequency range between 50 and 8,000 cycles is supplied by a transcription source or other sound source 119. Selector switch 120 when positioned with arm 121 in the "up" or "music" position effects application of the subscription radio musical program signals through upper contact 122 to the input of a pre-emphasis network 123, which serves to emphasize the higher audio frequencies for the purpose of attaining an improvement in signal-to-noise ratio at subscription radio receiving points, as will be described in further detail in subsequent paragraphs. The subscription radio program signals are then applied through low-pass filter 124 to the program limiting amplifier 125, which serves to maintain the upper limits of the subscription radio program level within a predetermined ceiling, adjustable in the manner of amplifier 115, for operational reasons as will be described in further detail in subsequent paragraphs. The subscription radio program signals are then applied to the input of a 30-kilocycle subcarrier source and modulator 40 (identical to the subcarrier signal source 40 of Fig. 2). The subcarrier source 40 is assumed to include the usual adjustable element for adjusting the output voltage which establishes the desired subcarrier modulation level and hence the modulation depth of the main carrier by the subcarrier signal. By preventing over-modulation of the subcarrier, which normally remains at a constant predetermined level, the limiting amplifier 125 also prevents additional modulation of the main carrier by the over-modulation peaks which might otherwise occur and which would vary the total modulation depth of the main carrier by the subcarrier.

In one preferred arrangement of the system of the invention, the modulator is a narrow-band FM type having a frequency swing of plus or minus 8 kilocycles or less with constant amplitude of the subcarrier being retained during the modulation process; the modulated subcarrier varying in frequency between the range of approximately 22 and 38 kilocycles is applied to the input of band-pass filter 41 and thence is applied through mixer 116 to the main carrier modulator 32 of the broadcast transmitter's power amplifier 33.

When selector switch 120 is in the "down" or "news-announcement" position, voice signals which may emanate from a magnetic recorder-reproducer 130 of any suitable well-known type, are applied to the input of pre-emphasis network 123 and thereupon modulate the 30-kilocycle FM subcarrier. If recurrent transmission of news bulletins or other information is desired an endless-loop type of magnetic recorder-reproducer may be used. In this case, steel tape 131 is moved as an endless loop over the driving roller 133 and rollers 132, 134 and 135 by means of the electric motor 136 and driving belt 137. Pick-up head 140 is employed to convert recorded magnetic variations in the steel tape corresponding to the audio frequency variations of the impressed voice signal to variations in voltage, with subsequent amplification of the signal voltage by audio amplifier 141, the output of which is connected to lower contact 142 of switching means 120. Thus, a pre-recorded news bulletin containing a complete news digest is, by means of this equipment, automatically transmitted in repetitive manner as long as the selector switch 120 is in the "news" position.

Microphone 145 may be employed by an announcer in making a subsequent recording of a later news bulletin. Speech amplifier 146 is employed in association with microphone 145 to amplify the voice signals to the required recording level when the voice signals are impressed on magnetic recording head 147. Alternatively, amplifier 146 may be connected directly to switch contact 142. Magnetic signal obliterating head 148 is utilized in association with the magnetic recorder in any conventional well-known manner to remove any previous recording.

Referring to program selector switch 120, it will be noted that arm 150 when in the "music" position applies a ground connection to upper contact 151, thereby completing the electrical circuit of which a frequency-determining capacitor 152 is a part; this circuit may be any conventional well-known audio frequency oscillating circuit 153 having a capacitor as one of the frequency-determining elements.

This oscillator which is of low frequency or audio frequency type has been termed a "security control signal oscillator" as its function is to supply a control signal of predetermined frequency for maintenance of security of uninterrupted reception of a selected type of program at subscription receiving points.

The security control signal of frequency $f_a$, such as 85 cycles, for example, is thereafter applied through switch contacts 189 and 190, when closed as will be described, to a subcarrier generator and modulator unit 154, operable at any of several designated frequencies within an illustrative frequency range extending between 30 and 70 kilocycles. Frequency control switch 155 when at position $f_1$ establishes a carrier frequency of 30 kilocycles, for example, by insertion of capacitor 157. When the frequency control switch 155 is at position $f_4$ capacitor 158 is inserted in the subcarrier generator circuit thereby establishing an upper subcarrier frequency of 70 kilocycles, for example.

The security control signal when at frequency $f_a$ causes either frequency modulation or amplitude modulation of the subcarrier, as desired, at a subcarrier frequency determined by the position of frequency-control switch 155.

It will be noted by referring to the illustration of program selector switch 120 that when arm 150 is in the "news" position, capacitor 160 is connected with ground through lower contact 161. This shifts the frequency of the security control signal oscillator 153 to a predetermined control frequency $f_b$, such as 87.5 cycles, or other frequency within a few cycles of the control frequency $f_a$ previously mentioned.

The lower control arm 165 of program selector switch 120 when in the "music" position engages upper contact 166 and thereby applies operating voltage to relay solenoid 168 from voltage source 167. Application of the voltage to this solenoid 168 moves relay armature 169 upward, opening the electrical circuit of which relay contact arm 170 is a part and thereby causes de-energization of solenoid 172 in series connection between electric power source 167, the relay armature 169 and contact 170. De-energization of solenoid 172 causes the release of latch armature 173 which when released, engages stop 175 of the driven clutch-disc 174, as in any well-known friction clutch, thereby preventing rotation of the driven disc 174. In other words, when solenoid 172 is de-energized, the latch 173 drops down to block the movement of the driven disc 174 of the friction clutch, the driving disc of which is rotated by the driving shaft 176 of electric motor 178. Under these conditions, the pulsing cam 180 attached to the driven disc 174 by means of shaft 176A remains in the idle position shown in the diagram.

Similarly, when program selector switch 120 is in the "news" position and the lower contact arm 165 engages with lower contact 182, the idle position of the pulsing cam, as shown in the diagram, is maintained for the reason that under these conditions voltage is applied to solenoid 168 and the armature 169 opens the circuit of which contact 170 is a part, thereby permitting latch armature 173 to remain in the down position, blocking the rotation of the driven disc 174 of the friction clutch.

At the completion of a musical selection intended for subscription radio listeners, program selector switch 120 is moved from the "music" position through the neutral position, as shown in the diagram of Fig. 5, to the "news" position. In passing through the neutral position energizing voltage is removed momentarily from solenoid 168. This releases relay armature 169 thereby closing the electrical circuit of which relay contact 170 is a part, thereby momentarily supplying voltage to solenoid 172 which causes the latch armature 173 to move upward, releasing the block from driven disc 174 of the friction clutch. This transitional condition is shown in Fig. 5. The raised point 185 on rotating pulsing cam 180 then moves the contact arms 189 and 186 of the pulsing switch 187 upward to their respective contacts 190 and 188, causing the momentary application of the security signal from audio oscillator 153 to subcarrier modulator 154 and thence to the input of band-pass filter 190, which is effective in passing without attenuation the subcarrier frequency range between 30 and 70 kilocycles. The security subcarrier, as a pulse, having a duration of a small fraction of a second, is then applied to mixer 116 via momentarily closed contact set 186—188, and thence to the main carrier modulator 32 of the FM broadcast transmitter 33.

It will be noted by referring to the arrangement of Fig. 5 that the momentary release of relay armature 169 occurs only during the very short interval during which the program selector switch 120 is moved between the "music" position and the "news" position. However, this transitional period is sufficient to effect the momentary release of armature 169 for a long enough time to allow latch 173 to permit rotation of the driven disc 174 of the friction clutch so that stop 175 clears the latch 173. Immediately thereafter relay armature 169 is pulled upward by application of power to relay solenoid 168 by the movement of switch 120 to the program position, opening the circuit of which contact 170 is a part and causing the downward movement of latch 173, with consequent blocking of rotation of driven disc 174 of the friction clutch after one revolution. In effect, this arrangement permits a pre-timed transmission of a single control pulse of short duration immediately upon termination of a given type of a multiplexed subscription radio program. Expressed in another way, this pulse is automatically transmitted for a short period during the transitional period between one type of multiplexed subscription program and another.

It will be noted, in addition, that the modulating frequency of the control pulse is at a pre-determined frequency, such as $f_a$, when the selector switch 120 is in the "music" transmission position as the pulsing cam 180 effects closure of switch 187, and at a second modulating frequency $f_b$ when switch 120 is in the "news" position.

To make as difficult as possible the determination and effective utilization of the security pulse control signal at unauthorized receiving points, a series of decoy pulses is automatically transmitted at random intervals at the subcarrier frequency employed for security control purposes. The decoy pulse is automatically transmitted at variable intervals as determined by the irregular rotation of decoy pulse control cam 195. This cam is rotated at an irregular and unpredictable speed varying from time to time by means of slippage on drive shaft 196 connecting with gear box 197 of any well-known type, which is driven by shaft 198 attached to motor 178. The raised member 200 of decoy pulse control 195 when in contact with switch 203 causes the intermittent, momentary closure of contact sets 201 and 202 of switching means 203. Closure of contacts 202 applies a decoy frequency $f_d$, such as 80 cycles, from decoy pulse oscillator 205 to the input of subcarrier modulator 154 thereby modulating the subcarrier output. The decoy pulse oscillator may be an audio-frequency signal generator, similar in general electrical respect to the security control signal oscillator 153, and have an operating frequency within several cycles of the security control frequencies $f_a$ and $f_b$ or any other frequency as may be desired. Closure of contacts 201 momentarily shunts contacts 188 and 186 and causes the application of the subcarrier signal from modulator 154 to the input bandpass filter 191. In this instance it will be noted that the security subcarrier is modulated by the frequency of the decoy pulse oscillator 205. The security subcarrier cannot be modulated by the correct control frequency, however, until pulsing cam 180 is actuated as determined by program switch 120.

The effective operation of the security means, as described above, is such that a security control pulse of predetermined frequency $f_a$ or $f_b$ is emitted automatically as modulating component of the security subcarrier of predetermined frequency $f_1$, $f_2$, $f_3$, or $f_4$ during the transition between types of subscription programs while the decoy pulse $f_d$ at a slightly different audio modulating frequency is automatically transmitted at random by the automatic pulsing equipment above described and designated as the decoy pulse transmitter. In each instance, the security and decoy signals are in the nature of audio frequencies of low order, such as 83, 85, and 87 cycles, modulating a subcarrier which may be predetermined in frequency between 30 and 70 kilocycles. However, the security and decoy signals may be of frequencies below audibility, such as 20, 25, and 30 cycles. The duration and characteristic of the security control signals may be other than shown in this illustrative application. For example, the control signals may be of varying duration or weight to effect selective operation of relays or receivers responsive to pulses of varying duration or weight.

In order to permit the centralized control of direction of transmission of the main aural program along an FM broadcast network, a main channel direction control switch 215 is employed to cause a shift in the operating frequency of direction control oscillator 216 operable within a range of 80 to 87 cycles. When the main aural program is to be transmitted from north to south along the network, as is the condition in Fig. 2, the control switch 215 is moved upward into the "north-to-south" position. This grounds capacitor 217, causing operation of the directional control oscillator at the audio frequency $f_1$, such as 87 cycles, for example; this audio control frequency is then applied to the subcarrier source and modulator unit 218, effecting modulation of its 18 kilocycle output by the 87 cycle control signal. The 18 kilocycle subcarrier from subcarrier modulator 218 is applied to the input of low-pass filter 31 which effectively passes the 18 kilocycle subcarrier without appreciable attenuation for subsequent transmission by broadcast transmitter 33.

When the main aural program transmission along the network is to be from south to north, as shown in Fig. 1, directional control switch 215 is moved downward to the "south-to-north" position thereby grounding the capacitor 220 and causing the operation of directional oscillator at a frequency $f_2$, which may be 80 cycles for example. In this instance, the 80-cycle control signal is applied to the subcarrier modulator 218 to effect modulation of the subcarrier output as has been previously described.

These directional control signals are utilized at the different stations in the radio relay system, as will be described in detail in following sections, to determine the opening and closing of control switches such as 45 of Fig. 2 and 20 of Fig. 1.

In similar manner, the direction of transmission of the subcarrier program signals along the network may be remotely controlled, employing switch 225 for this purpose. When switch 225 is in the "north-to-south" position capacitor 226 is connected with ground thereby establishing a control frequency $f_3$ in direction control oscillator 227 which oscillator may be of any well-known type in which a capacitor is a frequency determining element. In this case, the directional control oscillator functions at a subaudible frequency of 25 cycles, which is applied to the input of low-pass filter 124 of the subscription program channel.

When directional control switch 225 of the multiplex channel is in the "south-to-north" position capacitor 228 is connected to ground causing operation of the oscillator at sub-audible frequency $f_4$ such as 20 cycles which is applied to the input of low-pass filter 124. These control signals are employed at aural relay receiving points to actuate switches such as 47 and 49 of Fig. 2.

At control points intermediate terminal stations of a broadcasting network, such as the Philadelphia station 80 of Fig. 3 individual switches are employed for each direction of transmission of the main aural program. In this instance, as shown in Fig. 5A, "north-to-south" switch 230 is employed to connect capacitor 217 to ground thereby determining the frequency of control oscillator 216, as in Fig. 5. The added "south-to-north" switch 231 is used with a separate directional control oscillator such as 235 to cause separate application of a second control signal to the input of low-pass filter 124. The actuation of "north-to-south" switch 230 then controls the selective operation of switching means such as 53, Fig. 2, in stations to the south of the control station as described heretofore. The actuation of "south-to-north" switch 231 then controls the selective operation of switching means such as 29, Fig. 2, in stations to the north of the control station. Similar means, not illustrated, may be utilized to individually control the multiplex channel transmissions, if desired. In this manner, a program originating at the Philadelphia studio 102, Fig. 2, may be transmitted southward for retransmission by the Baltimore station and northward for retransmission by the New York station.

In operating the multiplex transmitting system of the invention, the amplitudes of the different signals applied through the main carrier modulator 32 of transmitter 33 (Figure 5) are adjusted so that the total modulation depth, and hence the frequency deviation, of the main carrier, produced concurrently by the different signals, is limited to a predetermined maximum value which is established by Government regulation, and designated as 100% modulation (or frequency deviation) of the radio carrier wave emitted by a frequency-modulation broadcasting station.

In actual operating tests satisfactory results have been obtained with a modulation percentage of 10–20% (of the maximum value above mentioned) as applied to the main carrier when modulated by the combined subcarrier signals. The maximum modulation percentage of the main aural program signals, as applied to the main carrier, is usually in the range from 80% to 90% (of the mentioned maximum value) depending upon the degree of modulation effected by the subcarrier signals.

Inasmuch as any over-modulation of the main carrier is apt to cause "splatter" or other distortion at receiving points, the program limiting amplifiers 115 and 125 are useful in establishing pre-determined ceilings for the signal levels in each channel leading to transmitter 33. Thus, for example, the mentioned control for the output of subcarrier source 40 may be set to limit the modulation percentage caused by the subcarrier signals to a predetermined level, such as 15% of the mentioned maximum modulation reference level. The upper level of these subcarrier signals will then automatically be established and the operator at the transmitter need only attend to the main program channel, with its program limiting amplifier 115 serving as an aid in establishing upper modulating levels in this channel.

Referring to Fig. 6, which is quite similar in many respects to the arrangement of Fig. 5, public program source 100 supplies aural program signals in the range 30–15,000 cycles through pre-emphasis network 30 to low-pass filter 31, thence to the program limiting amplifier 115 and mixer 116. From the mixer, the aural program signals are applied to the main carrier modulator 32 and the transmitter power amplifier 33 which supplies radio wave energy to omni-directional antenna 34 at frequency F–1.

A "business message" signal such as news bulletins, specialized information or radio-printer signals are applied from business message source 250 through low-pass filter 251 to limiting amplifier 252 and thence to a subcarrier source and modulator unit 253, operating at a mean subcarrier frequency of 55 kilocycles, for example. The modulated subcarrier is then applied through band-pass filter 254, effective to pass subcarrier energy in the band between 45–65 kilocycles to mixer 116 and thence to the FM broadcast transmitter including main carrier modulator 32 and power amplifier 33.

The subscription radio music source 119, identical to the source 119, Fig. 5, is employed as a source of audio signal energy in a second subcarrier channel. The audio frequency signals from subscription radio source 119 are passed through program selector switch 120 in the manner described in detail in connection with Fig. 5 and, when the selector switch 120 is in the "music" position, the subscription music signals are applied to pre-emphasis network 123, thence through low-pass filter 124, and program limiting amplifier 125 to subcarrier modulator unit 40. The modulated subcarrier signals, with center frequency of 30 kilocycles, for example, are then applied through band-pass filter 41, effective to pass carrier energy in the band 20–40 kilocycles without attenuation, to the mixer 116 and thence through the main carrier modulator 32 and power amplifier 33 to the antenna 34 as modulating components of the radio wave.

As has been described in connection with Fig. 5, the program selector switch 120 when in the "announcements" position applies voice signals from an announcement source 130.

Arms 150 and 165 of selector switch 120 are utilized in connection with the transmission of the security signals as has been described in preceding paragraphs. In this instance, the security control signal oscillator 153 is identical with that shown in Fig. 5, as are capacitors 152 and 160, respectively. The subcarrier source and modulator unit 154 is also identical with that of Fig. 5. The pulsing unit 188A and band-pass filter 191 are similar to those shown in detail in Fig. 5 and serve to apply the pulse signals within the range 30 to 70 kilocycles to mixer 116. For purpose of simplicity the decoy pulse arrangement has been omitted in this illustration, but it may be included as before.

By means of the system shown in Fig. 6 a total of three intelligence-bearing channels are employed in association with broadcast transmitter 33 and all channels may be activated simultaneously, each carrying its respective type of program, without interference between the channels and without causing interference with the reception of the main aural program of the transmitter in conventional FM broadcast receivers, provided that the sum of the depths of modulation of the main carrier with its main program signals and with the various subcarriers does not exceed the 100% maximum value as previously described.

Referring to Fig. 7, there is shown an illustrative multiplex and main program relay arrangement employed at an intermediate station in a network broadcasting system, such as the station 80, Fig. 1, located at Philadelphia, to effect remote or local control of direction of transmission of either program along the network.

Referring to the diagram of Fig. 1 wherein the main aural program signals are transmitted northward from Baltimore to New York, the broadcast signals, as radiated by antenna 16 at frequency F–3, Fig. 1, are picked up by unidirectional receiving antenna 17, Figs. 1 and 7, and applied to the input of an FM broadcast receiver 18, Figs. 1 and 7, termed the "south-to-north" receiver in the detailed diagram of Fig. 7.

The main aural program signals within the frequency range 30–15,000 cycles are applied from the audio output of receiver 18 through audio amplifier 260, Fig. 7, to the lowpass filter 19.

The main aural program signals in the 30–15,000 cycles range are then applied from the output of low-pass filter 19 through contacts 279 of relay switching means 20, when switching means 20 is in the closed position, as shown, and thence to amplifier 263. It is to be understood that the audio signal level at the output of amplifier 263 is adjusted in conventional manner by the adjustable gain control customarily included in such amplifiers. From amplifier 263, the signals are then applied to the pre-emphasis network 21, thence to the modulator 23, and finally to the power amplifier of transmitter 24, which supplies radio frequency wave energy, at frequency F–2, to omnidirectional antenna 25. In this illustrative application, the low-pass filter 22 shown in Fig. 1 is not required in aural transmission inasmuch as low-pass filter 19 effectively limits the radio frequency signals within the audio frequency range below 18 kilocycles and a second low-pass filter is therefore not essential in this particular relay operation.

Relay switch means 20 may be closed locally or by remote control from the Baltimore station. In the former instance, the contacts 279 of switching means 20 may be actuated manually as a part of a normal hand-operated switch, or the contacts 279 may be a part of a locally-controlled relay 20. In the latter, or remote control instance, the directional control signal from a directional control oscillator similar to 216, Fig. 5, located at the Baltimore station, operable at frequency $f_2$, is caused to modulate an 18 kilocycle subcarrier from a subcarrier modulator unit, such as 218, Fig. 5, located at the Baltimore station. This 18 kilocycle subcarrier signal is received at the Philadelphia station by receiver 18 and from the audio output of the receiver it is applied through amplifier 260 to low-pass filter 19 and band-pass filter 270 to a tuned subcarrier discriminator or detector 271, Fig. 7. The modulating component of the 18 kilocycle subcarrier, in this case the frequency, $f_2$, is derived from the subcarrier by the action of the subcarrier discriminator or detector 271 in well-known manner and is thereafter amplified by the audio amplifier 272 from whence the signal is applied to a tuned relay 273 of any well-known type responsive only to the modulating frequency $f_2$. The tuned reed 274 is activated upon application of modulation frequency $f_2$ thereby closing the circuit of which contact arm 275 is a part.

Vibration of reed 274 thereby applies a control voltage from electric power source 276 to the solenoid 277 of relay switching means 20. The relay switching means 20 may be of slow-response type which upon energization by alternating current from tuned reed relay 273 will steadily maintain the relay contacts in closed position without chatter.

When relay switching means 20 is in the closed position, it will be noted that electric power source 276 is applied through contacts 290 to the filament of a direction-indicating pilot light 291. Thus, visible actuation of this pilot light is determined by remote control from the Baltimore station, where the main aural program originates, in this instance, and serves a useful purpose in visually indicating to the operator of the Philadelphia station that the relay circuits should be in the south-to-north position, insofar as the main aural program signal transmission is concerned.

The multiplex subcarrier containing the subscription radio program signals from the New York station modulating the radio wave output of transmitter 33, Fig. 1, as radiated by omnidirectional antenna 34 at carrier frequency $F_1$ are picked up by unidirectional receiving antenna 42, Figs. 1 and 7, at the Philadelphia station. The radio frequency signals from New York then are applied to the north-to-south relay receiver 43, Figs. 1 and 7.

The subcarrier signals are taken from the FM discriminator of relay receiver 43 and are passed through cathode follower (or amplifier) 300 and thence to the input of high-pass filter 46, Figs. 1 and 7, which serves to pass to an amplifier 301 only the subcarrier frequencies above 20 kilocycles and to reject the audio frequency signals below 20 kilocycles. This amplifier is assumed to include the usual adjustable element for adjusting the output voltage. This adjustment, together with the mentioned adjustment of amplifier 263 establishes the proper, relative modulation levels as above described in connection with the terminal transmitter of Fig. 5. The subcarrier signals from the output of amplifier 301 are applied to the contacts 302 of relay switching means 47 which, when the relay is in the closed position, permits application of the subcarrier signals directly to the input of the FM modulator 23 associated with transmitter 24, as shown in Figs. 1 and 7.

It will be noted that in this relay process there need be no demodulation of the multiplex subcarrier, which is passed on directly without change in the subcarrier envelope to the input of the main modulator 23 of the FM broadcast transmitter 24. Contacts 303 of relay switching means 47 when in the closed position supply operating voltage from electric power source 276 to the filament of the direction indicating pilot light 304 thereby advising the operator at the Philadelphia station that the subcarrier program signals are being transmitted from New York southward along the broadcasting network.

This relay switching means 47 may be remotely controlled from the New York station as follows:

The multiplex directional control switching means 225, Fig. 5, in north-to-south position at the New York station determines the frequency of direction control oscillator 227, Fig. 5, located at the New York station. A sub-sonic modulation frequency $f_3$ is thereupon emitted by oscillator 227, Fig. 5, which is impressed on the subscription radio channel at the input of low-pass filter 124, Fig. 5. This control frequency, in the subaudible frequency range as has been described in preceding paragraphs, modulates the electric wave output of subcarrier modulator unit 40 having a mean frequency of 30 kilocycles and thereafter is transmitted as a modulating component of the subcarrier.

At the Philadelphia station, after reception as has been described above in connection with the program subcarrier, the 30 kilocycle subcarrier is applied from amplifier 301 to subcarrier discriminator or detector 310 which demodulates the subcarrier and permits the application of the modulating signals to be applied to low-frequency amplifier 311. The signals from the output of amplifier 311 are applied to the driving coils 312 of tuned reed relay 313. The tuned reed 314 of this relay when agitated by a modulated signal of specific control frequency $f_3$ closes the electrical circuit in which contact arm 315 is a part. This causes application of energizing voltage from voltage source 276 to the solenoid 316 of relay switching means 47, with consequent closing of contacts 302 and 303. In this manner, relay switching means 47 is selectively and remotely controlled by means of a specific control frequency of inaudible type transmitted along with the multiplexed program subcarrier from the New York station.

If the direction of multiplex subcarrier transmission were northward from Baltimore to New York, the multiplex direction-controlling signals would be applied from the FM discriminator of south-to-north relay receiver 18, Fig. 7, to amplifier 400. The control signals would then flow through the high-pass filter 401 to amplifier 402 thence through subcarrier discriminator 403 and amplifier 404 to the driving coils 405A associated with tuned reed relay 405. Energization of the tuned reed relay will, through contact 406 apply an operating voltage to solenoid 407 of relay switching means 49, Figs. 1 and 7, and this will close the contacts 408 and 409 of this relay. Closure of contacts 408 will apply subcarrier signals from amplifier 402 directly to the modulator 23 associated with broadcast transmitter power-amplifier 24. Closure of contacts 409 will apply energizing voltage to pilot lamp 304A from voltage source 276.

In similar manner, if the direction of transmission of the main aural program were from north-to-south along the network, as shown in Fig. 2, the directional control frequency $f_1$, Fig. 5, would modulate the 18 kilocycle subcarrier emitted by subcarrier modulator unit 218, Fig. 5, both located at the New York station.

At the Philadelphia relay station, the received 18 kilocycle subcarrier would pass through the band-pass filter 420, Fig. 7, associated with receiver 43 and the modulating components would be derived from the action of the subcarrier discriminator or detector 421. The control signal $f_1$ will then be amplified by amplifier 422 and applied to the driving coils 423A of tuned-reed relay 423. Excitation of this relay will close the electrical circuit of which contact 424 is a part and thereby will apply electric power from voltage source 276 to the solenoid 425 of the north-to-south relay switching means 45. In this event, the main aural program signals from low-pass filter 44 would be applied through contacts 261 directly to the modulator 23 of FM broadcast transmitter power amplifier 24, Figs. 1 and 7. In this instance, the contacts 430 of relay switching means 45 will also be closed thereby applying energizing voltage to the direction-indicating pilot light 431, Fig. 7.

Referring to Fig. 8, an illustrative arrangement of receiver circuit means at subscription radio receiving points is shown.

An FM broadcast receiver 500 is employed to receive the broadcast signals from the station, providing the subscription radio service in the area in which the receiver is located. The main aural program signals in the audio output 501 are applied to switching means 502 and thence to audio amplifier 503 and loud speaker 505 when the arm 504 of switching means 502 is in the position marked "public broadcast," for reproducing the main aural program.

The subscription radio program signals are derived from connection with the FM discriminator of broadcast receiver 500, as will be described in detail in subsequent paragraphs, and are applied through amplifier 510 to high-pass filter 511 which rejects the aural program signals below 20 kilocycles and passes only the subcarrier frequency above 20 kilocycles. The subcarrier signals are applied to amplifier or cathode follower 512 and the modulating components of the subcarrier are derived by the action of subcarrier discriminator or detector 513. The derived audio frequency signals are then passed through low-pass filter 514, which removes the subcarrier frequency and passes without attenuation the audio-frequency signals within the audio frequency range up to 8 kilocycles, employed as the upper frequency in this instance. The output of low-pass filter 514 is applied to the "news and music" contact 515 of switching means 502. When the arm 504 of switching means 502 is in position at contact 515, the subcarrier program signals, consisting of music and news or other announcements are applied to the input of audio amplifier 503 and are reproduced by loud speaker 505.

The means employed in this illustrative application of the system of the invention to effect selective reception of subscription musical programs and to give uninterrupted aural reproduction of music, without voice announcements, is explained as follows:

The subcarrier signals at the output of high-pass filter 511 are passed through amplifier 520 to subcarrier detecting circuit identified as a security carrier tuner 521. This security carrier tuner is tuned to a predetermined security control carrier frequency as supplied by a subcarrier source 154, Fig. 5, at the broadcasting station.

Provision is shown in this illustrative diagram, Fig. 8, for tuning of the security carrier receiving means to any of four pre-selected subcarrier frequencies by the switching means of which arm 522 and contacts 523, 524, 525 and 526 are a part. When the switch arm 522 is in position at contact 523 for example, tuning condenser 527 is in the tuning circuit of any well known tuning arrangement in which a capacitor may be used to determine the resonant frequency, and similar condensers such as 528 and 529 are connected in the tuning circuit when the switch is in position at contacts 524 and 525 respectively.

By this means the security carrier tuner may be pretuned to respond to a designated security pulse at a given subcarrier frequency in the range between 30 and 70 kilocycles. Unless the switching arm 522 is at the correct position at a given time, the effective reception of the security subcarrier pulse will not be possible.

The received security subcarrier is amplified by amplifier 530 and the modulating components of the security subcarrier are derived by action of the subcarrier discriminator or detector 531. The audio frequency output of the subcarrier discriminator 531 is applied to the driving coils 532 and 533 of two tuned-reed relays 534 and 535 respectively.

Referring to Fig. 5, as has been described in preceding paragraphs when the program selector switch 120 is in the "music" position the security control signal of frequency $f_a$ is generated by the security control oscillator 153 so that when the raised point 185 of the pulsing cam 180 closes contact arms 188 and 186, and arms 189 and 190 the security subcarrier modulator unit 154 will be modulated by this specific control frequency, such as 87 cycles.

Referring to Fig. 8 when this specific modulating frequency $f_a$ is applied as a pulse to tuned reed relay 534, the tuned reed 565 is excited in response to this specific control frequency only and the electric circuit, of which reed 565 and contact 566 are parts, is closed, thereby applying electric power from source 537 to the lock-in solenoid 538 of the locking-relay 539.

The armature 540 of this relay is pulled toward the lock-in solenoid 538 and lock-in latch 541 thereafter holds the armature in the closed position as shown. Contact arm 542 of locking relay 539 then engages contact 543 and closes the audio frequency circuit between the output of low-pass filter 514 and contact 545 of switching means 502. Thus, when the switch arm 504 is in position at contact 545, identified as "subscription radio music" position, the received subscription radio musical program is applied to audio amplifier 503 and is reproduced by loud speaker 505 as long as the armature 540 of the locking relay 539 is in the "lock-in" position shown in Fig. 8.

At the end of transmission of the subscription program, the selector switch 120 Fig. 5 is thrown to the "announcing" position and the security control signal of frequency $f_b$ is caused to modulate the subcarrier pulse emitted by subcarrier modulator unit 154.

Upon movement of selector switch 120 from the "music" position to the "announcing" position, the pulsing cam 180 is caused to rotate as has been previously described and the security subcarrier modulated by control frequency $f_b$, such as 85 cycles, is transmitted by the broadcast station.

At the receiver, 500, Fig. 8, as has previously been described in the above paragraphs, the security subcarrier is demodulated by subcarrier discriminator 531 and the modulating component, the security control signal of frequency $f_b$, causes the energization of tuned reed 567 when the exciting voltage is applied to coils 533 of tuned reed relay 535.

The agitation of the tuned reed 567 effects closure of the electrical circuit in which the reed 567 and contact 556 are parts. This causes electric power from source 537 to be applied momentarily to the "lock-out" solenoid 568 of locking relay 539. The latch 541 is thereupon pulled toward solenoid 568, releasing armature 540 of the lock-in section of relay 539, and thereby causing movement of armature 542 to contact 560, connected to ground. The grounding of armature 542 causes the muting of the audio amplifier circuit of which amplifier 503 is a part and therefore no sound is heard from loud speaker 505 as long as voice announcements are being transmitted on the subscription program subcarrier. In this manner, only subscription radio music will be heard from loud speaker 505 at authorized receiving points when switch arm 504 is in the "subscription radio music" position at contact 545 of switching means 502.

In the event that an attempt is made to mute the audio system of unauthorized receivers, it will first be necessary to ascertain the frequency of the security control carrier at any given period, then determine the precise modulating frequencies $f_a$ and $f_b$ of the security control signals, and finally, effect separation between these control signals of frequencies $f_a$ or $f_b$ and the decoy signals within several cycles of the control frequencies.

Ordinary tuned relays in unauthorized receivers will tend to be activated at random intervals through the automatic transmission of the decoy pulse transmitter 210 of Fig. 5. Thus, unless the frequency of the security subcarrier is known in advance and unless the exact control frequencies $f_a$ and $f_b$ also are known in advance, together with all details of operation, it is anticipated that unauthorized receivers would not operate satisfactorily in rendering the subscription service.

It is anticipated, in this connection, that coding combinations will be changed from time to time by the subscription radio service and that the tuned reed relays may be changed at intervals to provide added protection against unauthorized reception of the subscription radio music without interruption of the announcements. To aid in this direction, the tuned-reed relays 534 and 535 may be of plug-in type so that they may be changed with ease.

The general functioning of the security system of the invention is in general analogous to the cooperating action of a lock and its key. The security subcarrier of specific frequency corresponds to the matched longitudinal elements of the lock and key; the specific control frequencies $f_a$ and $f_b$ correspond to the varying notches in the profile of the key which must actuate certain tumblers of the lock in predetermined combination before the lock can be opened.

Referring to Fig. 9, an illustrative arrangement as shown whereby the subscription radio listener is enabled to have a selection of two different types of subcarrier programs utilizing an FM broadcast receiver tuned to the local FM broadcast station that provides the subscription radio service in addition to its public broadcast programs.

In this instance, the audio output 501 of FM broadcast receiver 500 is connected to program selector switch 502, at the contact marked "Broadcast" as described in connection with Fig. 8. The arm 504 of program selector switch 502 is connected to the input of the audio amplifier 503 whose output is connected to loud speaker 505, as has been described in Fig. 8. The subcarrier signals are derived from the discriminator of the FM receiver 500, as will be described in further detail in subsequent paragraphs, and are applied to amplifier 510 and high-pass filter 511.

The subcarrier at a frequency above 20 kilocycles, flows through the high-pass filter 511 to amplifier 512 and thence to the subcarrier discriminator or detector 513. The audio frequency output of the subcarrier discriminator or detector 513 flows through the low-pass filter 514 to the contact 543 of locking relay 539, as has been previously described in connection with Fig. 8. When contact arm 542 is in the "lock-in" position, as shown in the drawing, the audio frequency signals from low-pass filter 514 are applied through contact 543 and contact arm 542 to the contact 545 of switching means 502, marked "subscription radio music," as has been described in the above paragraphs, permitting only musical selections to be heard.

It will be noted in the arrangement of Fig. 9 that the output circuit of high-pass filter 511 is also connected to an amplifier 600, the output of which is connected to a subscriber discriminator or detector 601 operable at a mean carrier frequency of 55 kilocycles, for example.

The function of the subcarrier discriminator 601 is to demodulate the second program subcarrier emitted by a broadcasting station providing the subscription radio service. The audio frequency output of the discriminator is applied through low-pass filter 602 to switch arm 604 and contact 603, thence to contact 515 of program selector switch 502 marked "news." The arm 604 may be moved to contact 605 to apply radio printer signals to any well-known form of radio printing device 606, in the event that the second subcarrier is employed to convey printer control signals from time to time. The radio printer may take the form of a teletype machine, ticker-tape unit or other graphic recording device.

As has been previously described in connection with Fig. 5, the subscription radio broadcast station may have as a second subcarrier program transmission a continuously-available news summary of recurrent type. It will be seen, therefore, that if the business message source 250, Fig. 6, is employed to provide a recurrent news program at a subcarrier frequency of 55 kilocycles the listener at the subscription radio receiver will always hear a news summary when the arm 504 of program selector switch 502 is on contact 515 marked "news."

In the diagram of Figure 9, it will be noted that the general arrangement for attaining security of uninterrupted reception of music is identical with that of Figure 8. The block 610 marked "Security Unit" is identical to the block 610 of Figure 8, and comprises the elements shown therein.

Referring to Fig. 10, the detail of circuit connections of subcarrier receiving equipment and conventional FM broadcast receiving equipment is illustrated in one form. FM broadcast receiver 500, of any well-known type having an antenna 650 and ground connection 652 utilizes a standard balanced FM discriminator in which vacuum tube 653 is employed. The radio frequency input is applied in well-known manner to the anodes 654 and 655 of the tube 653. The discriminator output circuit includes resistors 656 and 657 in well known balanced circuit connection. Tuning meter 667 and associated resistor 668 are utilized in well-known manner as shown to indicate when the receiver is properly tuned to the carrier frequency. Capacitor 669 is a conventional radio-frequency by-pass condenser. The audio frequency output of the discriminator is applied to a standard 75-microsecond de-emphasis network consisting of resistor 666 and capacitor 661 after which the de-emphasized audio signals are passed through coupling capacitor 662 and volume control potentiometer 663 to the input of audio amplifier 664. The audio frequency output of amplifier 664 is applied to the contact marked "public broadcast" on switching means 502, the arm 504 being connected to the input of audio amplifier 503 which supplies audio driving power to loud speaker 505.

The subcarrier receiver 670 is connected to the output of discriminator tube 653 at terminal 671, as illustrated. The connection 672 between the FM receiver and the subcarrier receiver 670 may be of shielded type in which the shield 673 is connected to ground 674 as shown. The inner conductor 672 is connected to capacitor 675 of the subcarrier receiver thereby permitting the application of subcarrier signals to the control grid 676 of cathode follower tube 510. The cathode follower output of tube 510 is conventional and comprises capacitor 678, resistor 679 and load resistor 681. Cathode series resistor 680 is connected to ground as shown.

The signal energy appearing across load resistor 681 is applied to the input of high-pass filter 511 of any suitable well-known type providing a response such as that of curve 715, Fig. 11. Proper loading of the high-pass filter is effected by resistor 683 as shown. Subcarrier signal energy above 20 kilocycles after passage through the filter 511 is applied to the control grid 690 of amplifier tube 512 in conventional manner. The plate circuit output 692 of tube 512 is connected through coupling capacitor 693 to the control grid 694 of cathode follower tube 695. The cathode follower output circuit comprising capacitor 697, resistor 698 and load resistor 699 is then connected to the input of subcarrier discriminator filter 700. Subcarrier discriminator filter 700 may be of any suitable well-known type providing a frequency response whose slope characteristic in the cut-off region is substantially linear over the subcarrier range occupied by the subcarrier program signal during modulation. In this instance, where a subcarrier having a center frequency of 30 kilocycles is employed the discriminator response should be linear in the general range between the frequencies of about 20 and 40 kilocycles, assuming that an FM subcarrier is used, swinging within approximate limits of plus or minus 8 kilocycles with respect to the center frequency of 30 kilocycles. Such a subcarrier discriminator response is shown by the linear portion of the curve 716, Fig. 12, the upper cut-off being as shown at peak 716A.

The attenuating characteristics of high-pass filter 511 and discriminator filter 700 combine to provide a composite response curve 718 Fig. 13, resulting in great attenuation of the main aural program signals below 15 kilocycles.

The rectifier 701 in the output circuit of discriminator 700 Fig. 10 may be of well-known crystal-diode type or of vacuum tube type. The rectified signal voltage is then applied through series resistor 702 and load resistor 703 to the input of a low-pass filter 705 of any suitable well-known type, this low-pass filter being designed to pass without attenuation audio frequency signals below 10 kilocycles and to reject the subcarrier frequency in the range above 20 kilocycles.

The design of the low-pass filter 705 may be such as to provide a desired degree of de-emphasis to the rectified subcarrier program signal. It will be noted in this connection by reference to Fig. 5 that a pre-emphasis unit 123 is shown in the output circuit of the subscription music source 119. This pre-emphasis network in well-known manner emphasizes the higher audio frequencies of the subscription music channel. At the subscription subcarrier receiver 670 Fig. 10, these higher audio frequencies are attenuated by the de-emphasis characteristic of low-pass filter 705.

It is understood that in lieu of this particular arrangement for de-emphasis, a standard 75-microsecond de-emphasis network or other suitable network may be used. The output of low-pass filter 705 is applied to the contact 543 of locking relay 539, as has been described previously in connection with Figs. 8 and 9. The contact armature 542 of locking relay 539 is connected to contact 545 of selector switch 502 thereby causing the application of subcarrier program signals to audio amplifier 503 of FM broadcast receiver 500 when the switch arm 504 is in the "subscription radio" position.

The security subcarrier tuner 521 comprises coil 750 tuning capacitors such as 527, 528 and selector switch 522, all of which form a part of the subcarrier tuner 521 as illustrated. Subcarrier energy above 20 kilocycles is applied to the input of the subcarrier tuner 521 through connection of conductor 751 at the output terminal 752 of cathode follower tube 695. When the security subcarrier tuner 521 is properly tuned to the security subcarrier frequency effective signal voltage is applied to the input of amplifier 530 and thence to the subcarrier discriminator 531 as has been described in connection with Fig. 8. The subcarrier discriminator 531 may be similar in general respects to the discriminator filter 700 and includes a rectifier such as 701 and series and load resistors such as 702 and 703 but is effective over the range 30–70 kilocycles. Discriminator 531 then applies audio frequency security pulses to the tuned reed relays 534 and 535 as illustrated in detail in Fig. 8. These tuned reed relays are connected to the locking relay 539 as also is illustrated in detail in the diagram of Fig. 8.

It will be noted that the security subcarrier tuner has its output circuit connection 755 at a point of low relative impedance, in the secondary coil of tuning transformer 750 while the tuning capacitors 527 and 528 are connected across the total secondary winding through the switch 522. Such an arrangement provides a tuning circuit having an extremely sharp tuning characteristic thereby providing an added degree of protection against reception of unwanted subcarrier signals by the security subcarrier tuner.

While, from the foregoing description of the illustrative arrangement of units employed in the multiplex system of the invention a particular arrangement of circuits has been shown, it is to be understood that the scope of the invention is not limited to the arrangement of parts as depicted or to the particular choice of subcarrier frequencies as has been described or to the use of a frequency-modulation subcarrier.

It is to be understood that single side band subcarriers may be used in lieu of a single frequency-modulation subcarrier, and various types of subcarriers, detectors and security control devices may be utilized in lieu of the illustrated forms of equipment.

It will be noted in Figs. 1 and 2 that unidirectional receiving antennas 17 and 42 at a relay station are disposed in back-to-back relationship to each other. While this is a presently preferred arrangement of receiving antennas, there is no limitation implied with respect to such illustrative arrangement of antennas or type of antenna.

It should also be noted that the directional control signals may be impressed upon a plurality of stations in any network configuration with a particular control frequency regardless of location of originating station, being passed along the network to actuate control switches and other devices at each station in the network. In similar manner designated directional control frequencies and the control means of the invention, switches and other devices may be remotely controlled at stations in any network configuration for the purpose of establishing branch networks, interconnected with a master network such as shown in Figs. 1 and 2, or to establish selection of certain specific stations as a part of a network during certain intervals, as determined from a remote control point.

The phrase "security of reception of subscription radio programs of a given type" implies that radio programs intended for reception by subscribers or other authorized receiving points will, through the security control means, be heard at these authorized points only without intrusion of vocal announcements or signals of undesired type.

While the illustrative arrangement of the system of the invention refers to audio signals from a "public program source", such as block 100, Fig. 5, it is to be understood that signals of any suitable type from a primary signal source corresponding to public program source 100 may be utilized in directly modulating the main radio carrier or primary carrier. Likewise it is to be understood that signals of any suitable type from a secondary source or plurality of secondary sources such as "subscription radio music source" block 119, Fig. 6, may be utilized in modulating the subcarrier from its associated subcarrier, or secondary carrier source or sources, such as shown in block 40.

The device identified as "radio printer," block 606, Fig. 9, may be any device responsive to control by signal energy or control voltage received from a remote point. Such device 606 may be any suitable form of engraving machine, whereby a plate employed in printing newscopy is engraved by means of signals from a remote point, or such device may be a business machine or combination of business machines of various types such as accounting and computing machines responsive to control signals from a remote point. Further, such device 606 may be any suitable means utilized for telemetering, teleselector and remote control functions.

It also will be observed from the above description of the operation of the radio relay portion of the system of the invention that a novel method is employed in attaining unidirectional or bidirectional transmission of different types of programs along a broadcast network. The bidirectional, or "cross-relay", transmission, in which the main aural program signals may be relayed in one direction while the subcarrier signals are relayed in the opposite direction along a network of conventional FM broadcasting stations, provides a high degree of flexibility of operation of network broadcast facilities heretofore unattained in the art.

While a preferred embodiment with certain modifications of the invention is shown herein, it is to be understood that variations, modifications and changes may be made within the spirit of the subjoined claims.

What is claimed as new and desired to be secured by Letters Patent of the United States is:

1. A broadcasting system for concurrently disseminating a main audio program and one or more multiplex programs over a geographical area comprising the total overlapping broadcast service areas of a plurality of broadcast stations, including an originating broadcast station having means for frequency-modulating its main radio carrier by first audio program signals within a wide frequency range, means for frequency-modulating the main radio carrier output of said station by superaudible subcarrier signals concurrently with modulation by said first audio signals, means for modulating said subcarrier by second program signals, a second broadcast station operable at a carrier frequency different from that of said originating broadcast station, means for modulating the main radio carrier of said second station, a source of third program signals individual to said second station, receiver means at said second station responsive to the main carrier from said originating broadcast station, said receiver means having means for demodulating the main carrier only and including two output circuits, first filter means connected in the first of said output circuits proportioned to pass only said first audio program signals from said originating station, and second filter means connected in the other of said output circuits proportioned to pass only said modulated superaudible subcarrier signals whereby said first audio program signals pass through only one of said two output circuits and whereby said modulated superaudible subcarrier signals pass through only the other of said two output circuits, and means for modulating the main radio carrier of said second station by said modulated superaudible subcarrier signals.

2. Multiplex radio equipment adapted to relay in a given direction signals initiated at a broadcast station, said equipment including an omni-directional radio broadcast transmitter having means for frequency-modulating its main carrier by audio program signals and simultaneously by superaudible subcarrier signals, radio broadcast receiver means having demodulating means for demodulating only the main carrier to develop an audio signal received from the initiating station, said demodulating means having an output circuit for undemodulated subcarrier signals received from said initiating station, said subcarrier output circuit of said demodulating means including filter means proportioned to pass only said undemodulated subcarrier signals, and means for coupling said undemodulated subcarrier signals from said filter means to said frequency-modulating means of said omni-directional broadcast transmitter.

3. Multiplex radio equipment in accordance with claim 2 in which said last mentioned coupling means includes a subcarrier amplifier having means for establishing the level of said undemodulated subcarrier independently of the level of said audio program signals.

4. Multiplex radio equipment in accordance with claim 2 in which said radio broadcast receiver means includes a unidirectional receiving antenna which is adapted to receive primarily signals transmitted by said initiating broadcast station.

5. Multiplex radio equipment adapted to relay signals in either direction between two initiating broadcast stations, said equipment including an omni-directional radio broadcast transmitter having means for frequency-modulating its main carrier by audio program signals and simultaneously by superaudible subcarrier signals, first and second radio broadcast receiver means each having demodulating means for a main carrier only to develop an audio signal and each said demodulating means having an output circuit for undemodulated subcarrier signals of different superaudible frequencies, said subcarrier output circuit of each demodulating means including filter means proportioned to pass only undemodulated subcarrier signals from different ones of said initiating stations, switching means coupled to each of said subcarrier output circuits and to said frequency-modulating means by which either of said subcarrier output circuits is selectively connectible to the frequency-modulating means of said omni-directional transmitter, whereby at least one of said subcarrier signals received from said initiating stations can be relayed without demodulation in at least two directions.

6. Multiplex radio equipment in accordance with claim 5, in which a subcarrier amplifier is connected between each said filter means and said switching means, each amplifier having means for establishing respectively the level of a different one of said undemodulated subcarriers independently of the level of said audio program signals.

7. Multiplex radio equipment in accordance with claim 5 in which each of said radio broadcast receiver means includes a unidirectional receiving antenna adapted to receive primarily signals from only a different one of said initiating broadcast stations.

8. Multiplex radio equipment adapted to relay signals in either direction between two initiating broadcast stations, said equipment including an omni-directional radio broadcast transmitter having means for frequency-modulating its main carrier by audio program signals and simultaneously by superaudible subcarrier signals, first and second radio broadcast receiver means each having demodulating means for a main carrier only to develop an audio signal and each said demodulating means having an output circuit for undemodulated subcarrier signals of a different superaudible frequency, said subcarrier output circuit of each demodulating means including filter means proportioned to pass only undemodulated subcarrier signals from different ones of said initiating stations, and means for coupling said undemodulated subcarrier signals from said filter means to said frequency-modulating means of said omni-directional broadcast transmitter, whereby said subcarrier signals received from said initiating stations can be relayed without demodulation in at least two directions.

References Cited in the file of this patent

UNITED STATES PATENTS

| Number | Name | Date |
|---|---|---|
| 1,733,609 | Kuhn | Oct. 29, 1929 |
| 2,017,126 | Kroger | Oct. 15, 1935 |

| Number | Name | Date |
|---|---|---|
| 2,106,806 | Latimer et al. | Feb. 1, 1938 |
| 2,146,301 | Knotts et al. | Feb. 7, 1939 |
| 2,155,821 | Goldsmith | Apr. 25, 1939 |
| 2,233,183 | Roder | Feb. 25, 1941 |
| 2,245,347 | Koch | June 10, 1941 |
| 2,282,971 | Koch | May 12, 1942 |
| 2,321,651 | Caraway, Jr. | June 15, 1943 |
| 2,340,798 | Deal | Feb. 1, 1944 |
| 2,392,672 | Koch | Jan. 8, 1946 |
| 2,401,333 | Bumstead | June 4, 1946 |
| 2,421,727 | Thompson | June 3, 1947 |